(12) United States Patent
Raby

(10) Patent No.: US 12,076,210 B2
(45) Date of Patent: Sep. 3, 2024

(54) ELASTOMERIC ORTHODONTIC BRACKET

(71) Applicant: Solventum Intellectual Properties Company, Maplewood, MN (US)

(72) Inventor: Richard E. Raby, Lino Lakes, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

(21) Appl. No.: 18/077,593

(22) Filed: Dec. 8, 2022

(65) Prior Publication Data

US 2023/0109622 A1   Apr. 6, 2023

Related U.S. Application Data

(63) Continuation of application No. 16/466,332, filed as application No. PCT/US2017/064168 on Dec. 1, 2017, now abandoned.

(60) Provisional application No. 62/432,420, filed on Dec. 9, 2016.

(51) Int. Cl.
*A61C 7/14* (2006.01)
*A61C 7/08* (2006.01)

(52) U.S. Cl.
CPC .............. *A61C 7/141* (2013.01); *A61C 7/08* (2013.01); *A61C 7/148* (2013.01)

(58) Field of Classification Search
CPC ......... A61C 7/08; A61C 7/12–18; A61C 7/20; A61C 7/141; A61C 7/148
See application file for complete search history.

(56) References Cited

U.S. PATENT DOCUMENTS

| | | | |
|---|---|---|---|
| 3,936,939 A | | 2/1976 | Faunce |
| 4,536,154 A | | 8/1985 | Garton, Jr. et al. |
| 5,055,039 A | * | 10/1991 | Abbatte ............ A61C 7/08 |
| | | | 433/24 |
| 5,078,596 A | | 1/1992 | Carberry et al. |
| 5,254,002 A | | 10/1993 | Reher et al. |
| 5,267,855 A | | 12/1993 | Tuneberg |
| 6,648,638 B2 | | 11/2003 | Castro et al. |
| 6,845,175 B2 | | 1/2005 | Kopelman et al. |
| 7,027,642 B2 | | 4/2006 | Rubbert et al. |
| 7,234,937 B2 | | 6/2007 | Sachdeva et al. |
| 7,306,458 B1 | | 12/2007 | Lu |
| 7,731,495 B2 | | 6/2010 | Eisenberg et al. |

(Continued)

FOREIGN PATENT DOCUMENTS

DE   102007011376 A1   9/2008
WO   1996035392 A1   11/1996

(Continued)

OTHER PUBLICATIONS

Translation of WO 20100146192 (Year: 2010).*
International Search report for PCT International Application No. PCT/US2017/064168 mailed on Mar. 15, 2018, 4 pages.

*Primary Examiner* — Jacqueline T Johanas
*Assistant Examiner* — Matthew P Saunders

(57) ABSTRACT

An orthodontic bracket can include a bracket body. The bracket body can include an outer body. The bracket body can also include an inner body coupled to the outer body. The orthodontic bracket can include a bracket base configured to couple to a tooth. The inner body of the outer body is disposed between the outer body and the bracket base.

12 Claims, 10 Drawing Sheets

FIG. 8A

(56) References Cited

U.S. PATENT DOCUMENTS

| | | |
|---|---|---|
| 8,194,067 B2 | 6/2012 | Raby et al. |
| 8,491,306 B2 | 7/2013 | Raby et al. |
| 8,738,165 B2 | 5/2014 | Cinader, Jr. et al. |
| 9,539,065 B2 | 1/2017 | Cinader, Jr. et al. |
| 10,052,175 B1 * | 8/2018 | Patel ........................ A61C 7/20 |
| 2004/0029068 A1 | 2/2004 | Sachdeva et al. |
| 2007/0031791 A1 | 2/2007 | Cinader, Jr. et al. |
| 2007/0231767 A1 | 10/2007 | Sears et al. |
| 2009/0220920 A1 | 9/2009 | Primus et al. |
| 2011/0300502 A1 | 12/2011 | Kishi |
| 2013/0325431 A1 | 12/2013 | See et al. |
| 2014/0255865 A1 * | 9/2014 | Gautam ................. A61C 7/002 433/9 |
| 2015/0182306 A1 | 7/2015 | Chen et al. |
| 2015/0238282 A1 | 8/2015 | Kuo et al. |
| 2016/0256241 A1 | 9/2016 | Wigal |
| 2016/0331950 A1 * | 11/2016 | Su ............................ A61C 7/28 |
| 2017/0000587 A1 | 1/2017 | Wigal |
| 2017/0319295 A1 * | 11/2017 | Bach ..................... A61C 7/145 |
| 2018/0049847 A1 * | 2/2018 | Oda ....................... A61C 7/002 |
| 2020/0107911 A1 * | 4/2020 | Roein Peikar ......... A61C 7/145 |

FOREIGN PATENT DOCUMENTS

| | | | |
|---|---|---|---|
| WO | 2004052229 A2 | 6/2004 | |
| WO | 2005115265 A1 | 12/2005 | |
| WO | 2007084727 A1 | 7/2007 | |
| WO | 2007133422 A2 | 11/2007 | |
| WO | WO-2010146192 A1 * | 12/2010 | ............... A61C 7/00 |
| WO | 2016007646 A1 | 1/2016 | |

* cited by examiner

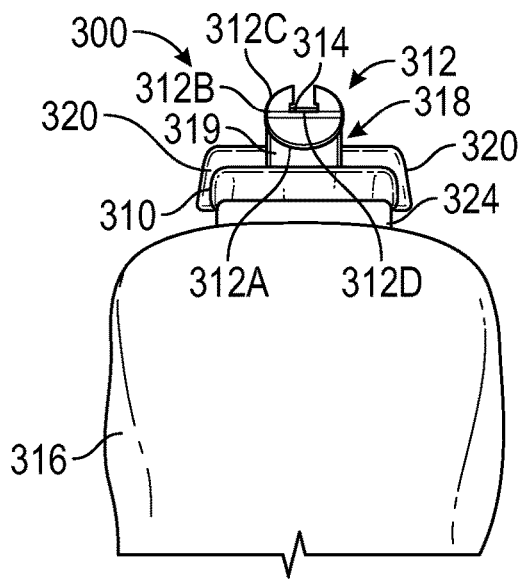
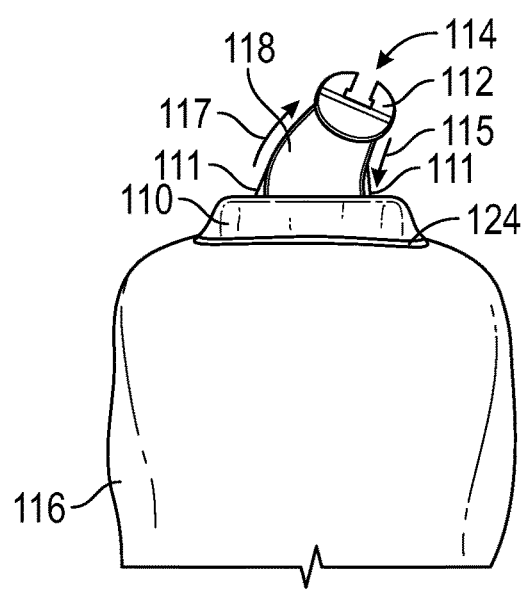
FIG. 3　　　　　FIG. 4
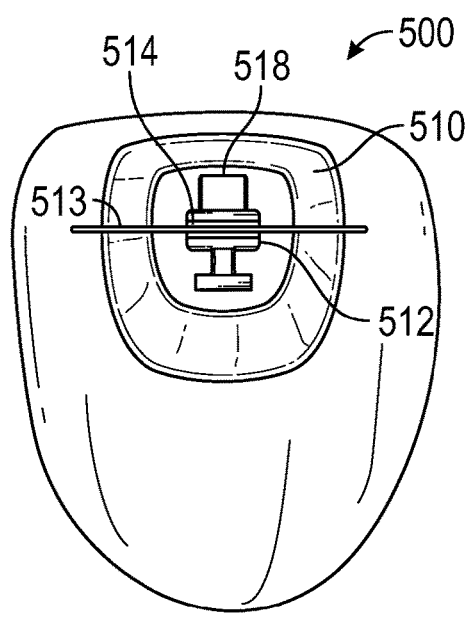
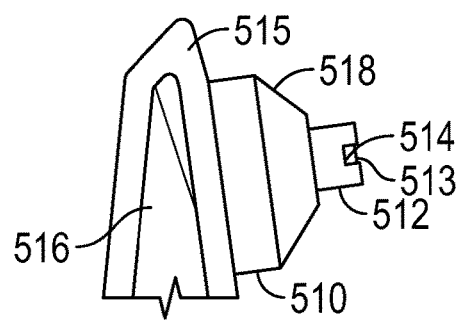
FIG. 5A　　　　　FIG. 5B

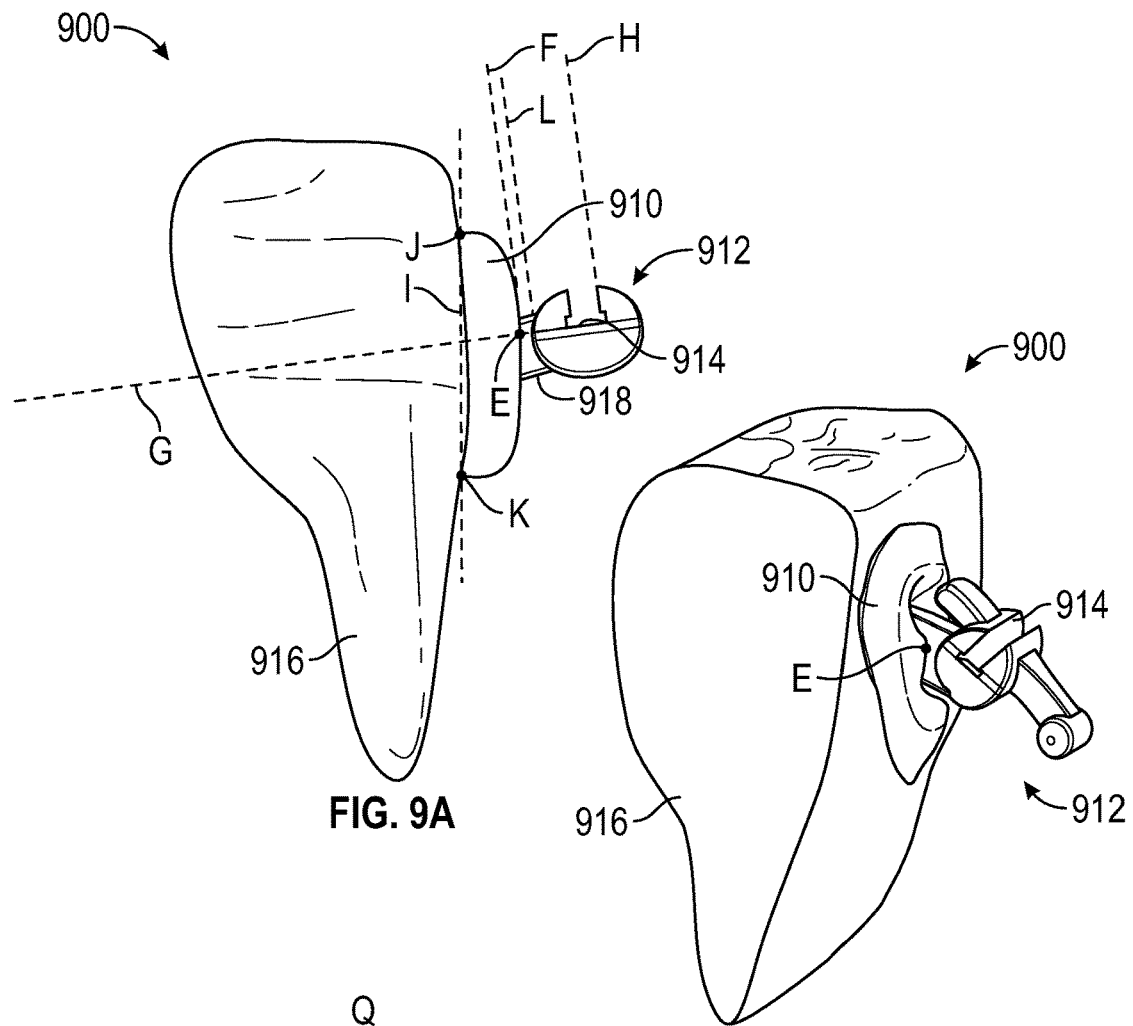
FIG. 9A
FIG. 9B
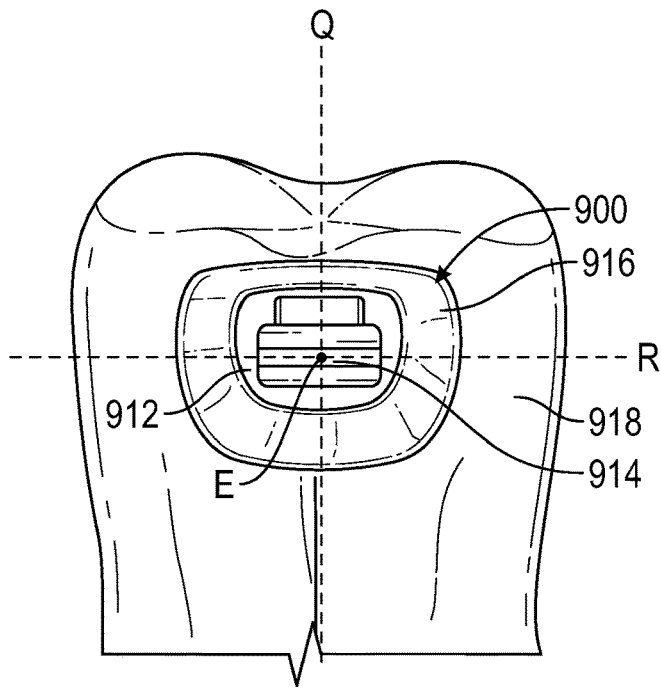
FIG. 9C

ELASTOMERIC ORTHODONTIC BRACKET

CROSS REFERENCE TO RELATED APPLICATIONS

This application is a continuation of U.S. application Ser. No. 16/466,332, filed Jun. 4, 2019, which is a national stage filing under 35 U.S.C. 371 of PCT/US2017/064168, filed Dec. 1, 2017, which claims the benefit of U.S. Provisional Application No. 62/432,420, filed Dec. 9, 2016, the disclosures of which are incorporated by reference in their entireties herein.

BACKGROUND

This disclosure relates to orthodontics and, more particularly, orthodontic appliances.

The field of orthodontics is concerned with repositioning a patient's teeth for improved function and aesthetic appearance. For example, orthodontic treatment often involves the use of tiny slotted appliances, known as brackets, which are generally fixed to the patient's anterior, cuspid, and bicuspid teeth. An arch member can be received in the slot of each bracket and serves as a track to guide movement of the teeth to desired orientations.

Orthodontic brackets are typically formed as a solid unit having a bracket base and the bracket body where the force applied by an arch member is transferred directly through the orthodontic bracket and onto a tooth. The arch member may be secured to the orthodontic bracket in order to transfer the forces from the arch member to the tooth. Situations may exist where a first tooth may require a lower amount of applied force than a second, adjacent tooth and a stiff arch member (such as a 19×25 mil stainless steel rectangular arch wire) is desired for the first tooth. Ordinarily, this may necessitate a series of different arch members. Additional situations may exist where earlier treatment options for severe malocclusions are desirable.

Various solutions such as those proposed by WO2004052229 (Andreiko) have called for an elastomeric section to be placed between the tooth and the bracket base. This positioning may not provide sufficient elasticity when applying certain forces to correct alignment of teeth. Further, bond strength can be easily compromised by concentrating stress near the perimeter of a bracket base because the stress across the bracket base is not uniform as an elastomer deforms under stress.

SUMMARY

Aspects of the present disclosure relate to disposing an inner elastomeric body at least adjacent to an outer bracket body. By disposing the inner body adjacent to the bracket body, the axis of rotation is maintained while dispersing forces from an arch member. Further, the inner body can create a customized clearance between the arch member and the tooth.

Various embodiments of the present disclosure provide for an orthodontic bracket. An orthodontic bracket can include a bracket body. The bracket body can also include an inner body coupled to the outer body. The orthodontic bracket can include a bracket base configured to couple to a tooth. The inner body of the bracket body is disposed between the outer bracket body and the bracket base. The present disclosure also provides for a dental appliance which includes a plurality of polymeric shell portions each having one or more cavities shaped therein to receive one or more teeth. Each of the plurality of shell portions is formed to be separate from the other plurality of shell portions.

In at least one embodiment, the orthodontic bracket can be removable, or it may be bonded to the teeth, preferably using a weak adhesive similar to a denture cement. A dental appliance comprising one or more of the shell portions can also include a bracket body, wherein the body is comprised of an inner body portion, which is elastomeric, and an outer body portion. The outer body portion may include a slot (formed therewith) for receiving an archwire, or it may couple directly to an arch member fabricated of the same or a different material. The arch member can assume a variety of forms, including a thin, elongated member similar to a wire, a rod, or a beam; a broad, flat ribbon or band; a tray; or a truss.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application,

BRIEF DESCRIPTION OF THE DRAWINGS

FIG. 3 illustrates a lateral view of an orthodontic bracket with an enveloping section, looking towards its distal side.

FIG. 4 illustrates a lateral view of the orthodontic bracket shown in FIG. 1A with a stressed inner body, looking towards its distal side.

FIG. 5A illustrates a lingual view of an orthodontic bracket with an inner body.

FIG. 5B illustrates a lateral cross-section view of an orthodontic bracket with an inner body, looking towards its distal side.

FIG. 9A illustrates a side view of the orthodontic bracket with an inner body mounted lingually on a lower tooth, looking towards its distal side.

FIG. 9B illustrates an oblique side view of the orthodontic bracket shown in FIG. 9A, looking towards its lingual and distal surfaces.

FIG. 9C illustrates a facial view of the orthodontic bracket shown in FIG. 9A.

While the above-identified figures set forth several embodiments of the disclosure, other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION

Definitions

As used herein with respect to directions:

"Mesial" means in a direction toward the midline or center of the patient's curved dental arch.

"Distal" means in a direction more distant or away from the midline of the patient's curved dental arch.

"Occlusal" means in a direction toward the occlusal plane or outer tips of the patient's teeth.

"Gingival" means in a direction toward the patient's gums or gingiva.

"Facial" means in a direction toward the patient's lips or cheeks.

"Lingual" means in a direction toward the patient's tongue.

Aspects of the present disclosure relate to an orthodontic bracket having a bracket body and a bracket base. In particular, the bracket body can include two sections, an inner body and an outer body. The inner body can be elastomeric.

The sections below describe illustrative embodiments directed to orthodontic brackets or appliances and methods related thereto. These embodiments are exemplary and accordingly should not be construed to unduly limit the invention. For example, it is to be understood that one of ordinary skill in the art can adapt the disclosed appliances and methods for attachment to either the labial or lingual surfaces of teeth, to different teeth within the same dental arch (for example, corresponding appliances on mesial and distal halves of the dental arch), or to teeth located on either the upper or lower dental arches.

The appliances and methods described herein nay optionally be customized to the individual patient undergoing treatment. Material and dimensional specifications could also vary from those disclosed herein without departing from the scope of the claimed invention. Unless otherwise specified, the provided appliances and components could be constructed of any of a variety of metal, ceramic, polymeric, and composite materials known to those skilled in the art. Further, unless otherwise indicated, exemplary dimensions associated with the appliances and their components are not critical and the accompanying drawings are not necessarily drawn to scale.

Figure 1A:
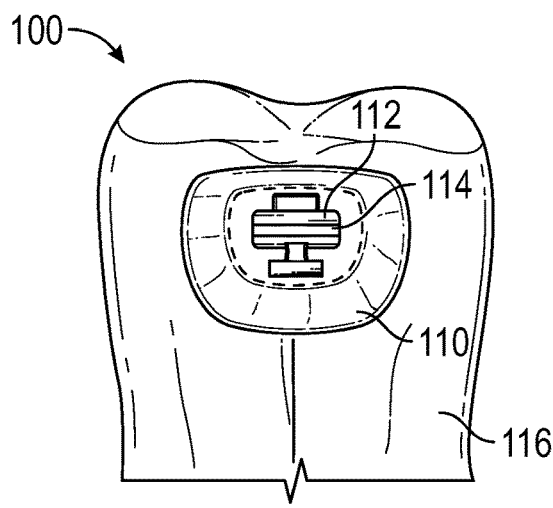
FIG. 1A illustrates a facial view of an orthodontic bracket with an inner body.
Figure 1B:
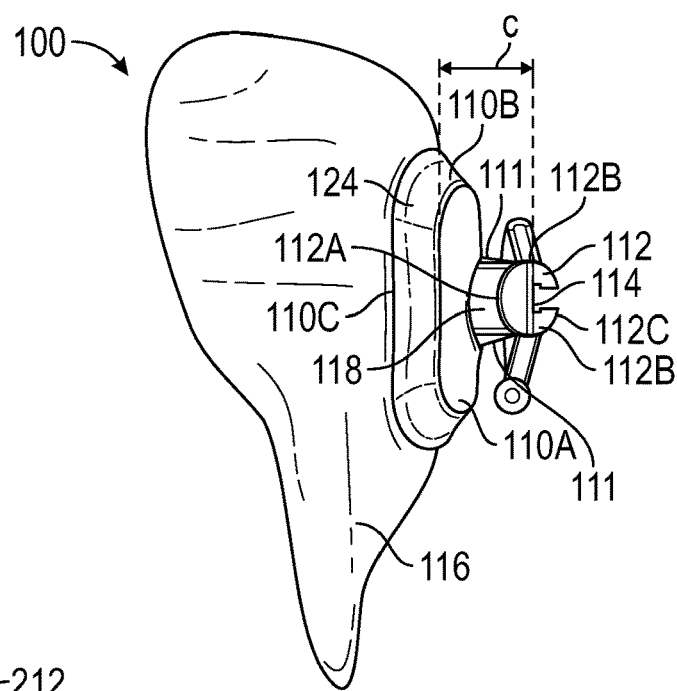
FIG. 1B illustrates a lateral view of the orthodontic bracket shown in FIG. 1A, looking towards its distal side.

An orthodontic bracket 100 according to one embodiment is shown in FIGS. 1A-1B. The orthodontic bracket 100 of this embodiment and the dental appliances of other embodiments, unless otherwise indicated, are described herein using a reference frame attached to a facial surface of a tooth on the upper or lower jaw. Consequently, terms such as vestibular (which includes buccal, labial, and facial), lingual, mesial, distal, occlusal, and gingival used to describe the orthodontic bracket 100 are relative to the chosen reference frame. The embodiments, however, are not limited to the chosen reference frame and descriptive terms, as the orthodontic bracket 100 may be used on other teeth and in other orientations within the oral cavity. For example, the orthodontic bracket 100 may also be coupled to the labial surface of the tooth. Those of ordinary skill in the art will recognize that the descriptive terms used herein may not directly apply when there is a change in reference frame. Nevertheless, the embodiments are intended to be independent of location and orientation within the oral cavity, and the relative terms used to describe embodiments of the orthodontic bracket are to merely provide a clear description of the embodiments in the drawings. As such, the relative terms vestibular, lingual, mesial, distal, occlusal, and gingival are in no way limiting the embodiments to a particular location or orientation.

The bracket 100 comprises a bracket base 110 which can couple to a bracket body. The bracket body can comprise an elastomeric section 118 (which may be referred to as an "inner body"), and an outer body 112. The bracket body can refer to the components that are not the base. In FIG. 1A, the bracket 100 has a bracket base 110 (which may be referred to simply as a "base") having at least a first surface 110A and a second surface 110B and a third surface 110C. The first surface 110A may be the side facing an outer body 112 (which may be referred to as an "outer body") while the second surface 110B can be a side of the base. The third surface 110C may be the side facing a tooth 116. The third surface 110C can be adapted for bonding adhesive 124 to the tooth 116. Thus, the third surface 110C can have an adhesive 124 applied to bond the bracket to the tooth 116. The adhesive 124 can be optional depending whether other attachment means are employed.

The outer body 112 can be the portion that is configured to couple to an arch member. The arch member can work in cooperation with the bracket to adjust the position of a tooth. Examples of arch members are made from a variety of metals, polymers, or ceramics. A variety of connection means or securement means are possible to connect the outer body 112 to the arch member. The outer body 112 can have a variety of implements to couple to or bond with the arch member. For example, the outer body 112 can optionally have at least one slot or channel 114 (formed therewith) to receive an arch member such that a force is generated sufficient to reposition a tooth. In some embodiments, the outer body can include a slot liner for protecting the inner body 118 from excess friction from a metallic arch member. The outer body 112 can include optional securement means such as tie wings or, in certain implementations, the outer body 112 can comprise a self-ligating securement means as disclosed in PCT Publication WO2016007646 (Yick, et al.).

An outer body 112 generally extends outwardly in a direction opposite from the base 110 in a facial or lingual direction, away from the second surface 110B. Optionally, and as shown, the base 110 and outer body 112 are separate components.

The base 110 can be referred to as a bracket pad or a bonding pad. In at least one embodiment, the shape of a base can based on statistically normal dental anatomy, i.e. "one shape fits all." In other embodiments, the base is custom-designed to perfectly conform to the shape of the tooth. The size of the base 110 or pad can be quite variable, ranging from the minimum size needed to achieve reliable bond strength to a band or ring that surrounds the tooth to a cap or shell that fully occludes all exposed tooth surfaces. In some embodiments, the base 110 can be polymeric and largely conform to a tooth 116. For example, the base 110 can engage the tooth via a snap-fit configuration, making use of undercuts in the tooth 116 anatomy to lock in place.

In certain embodiments, the base 110 and outer body 112 may be made, for example, via machine or molded from a polymeric material as disclosed in U.S. Pat. No. 4,536,154 (Garton, et al.), a ceramic material such as a fine-grained polycrystalline alumina as disclosed in U.S. Pat. No. 6,648,638 (Castro, et al.), or a polymer-ceramic composite, such as glass-fiber-reinforced polymeric composites as disclosed in U.S. Pat. No. 5,078,596 (Carberry, et al.) and U.S. Pat. No. 5,254,002 (Reher, et al.). Other suitable materials include, for example, metallic materials (such as stainless steel, titanium, and cobalt-chromium alloys) and plastic materials (such as thermoset resin like an acrylate or epoxy).

The base 110 or outer body 112 is generally made from a rigid material that bonds to a tooth 116. The base 110 is not intended to deform in relation to an arch member. The thickness of the base can also vary, but the thickness can be at least 25 microns, at least 50 microns, or at least 75 microns.

The base 110 is the portion of the appliance that bonds to the tooth 116 at the third surface 110C, or at least interfaces the tooth 116. There is no upper size limit on a base 110, thus a base 110 could even cover an entire crown. In some embodiments, a lower size limit of the base 110 is determined by the strength of the adhesive, or even the patient's enamel, and the amount of stress placed on the bond interface. While the base 110 can have a variety of sizes, some exemplary sizes are at least 1 square millimeter, at least 2 square millimeters, at least 3 square millimeters and so forth An adhesive 124 can bond the base 110 to the tooth 116. The tooth 116 can be a variety of biological or polymeric materials, for example, a patient's tooth, a tooth model, or a ceramic. In various embodiments, the third surface 110C is mostly concave and substantially conforms to the convex outer surface of the tooth. In certain embodiments, the outer surface 110C may feature a compound contour, with curvature in both the mesial-distal and occlusal-gingival directions.

As shown in FIG. 1I3, the first surface 112A of the outer body 112 can be disposed adjacent to an inner body (described herein). The inner body 118 can be formed from an elastomeric material. As used herein, the terms inner body and elastomeric section can be used interchangeably. The inner body 118 can be disposed such that at least a portion of the first surface 112A contacts the inner body 118. In various embodiments, the inner body 118 can be disposed such that at least a portion of the second surface (i.e., sides) 112B are contacted. In various embodiments, the third surface 112C can optionally contact the inner body 118. Any one or more of the first surface 112A, second surface 112B, and third surface 112C can also optionally have an adhesive disposed thereon to secure the inner body 118 to the outer body 112.

The inner body 118 can also be disposed between the outer body 112 and the base 110. For instance, the inner body 118 is shown contacting the base 110 and the outer body 112. The inner body 118 can be disposed such that at least a portion of the first surface 110A contacts the inner body 118. In various embodiments, the inner body 118 can be disposed such that at least a portion of the second surface (i.e., sides) 1101B are contacted. In various embodiments, the third surface 110C is the surface of the bracket base 110 that bonds to the tooth 116. The first surface 110A, second surface 110B, and third surface 110C can also optionally have an adhesive to secure the inner body 118.

Various textures can be introduced to the base 110 or body 112 to facilitate adhesion to the inner body 118. For example, the first surface 110A may include mesh, holes, bumps, recesses, undercuts, a microetched surface, glass grit, bonded particles, an organo-silane treated surface, or any other known mechanical or chemical modification to enhance adhesive bonding between the base 110 and the inner body 118.

The inner body 118 can include one or more flanges 111 to facilitate adhesion to either the outer body 112 or the base 110. The flanges 111 can taper toward the middle of the inner body 118 layer. The flange 111 and other mechanical interlock features can be various sizes. For example, a surface having features of no greater than 50 microns in size can be possible. Even smaller features are possible if microreplication, or chemical etching techniques are used.

The base 110 can have various textures to facilitate adhesion to the tooth 116. For example, the base 110 could also have a banded configuration in which the base 110 at least partially envelops the tooth 116 to provide an even stronger bond. In other implementations, the base 110 may include a fixed, compressible material to assist in filling gaps between the base 110 and the tooth 116. Suitable compressible materials are described in U.S. Pat. No. 9,539,065 (Cinader).

The inner body 118 can be formed from any material with sufficient flexibility (e.g., elastomeric materials as defined by the modulus of elasticity of the material at 37 degrees Celsius) and structural properties. The inner body 118 can be defined by a material having a modulus of elasticity that is relative to another component of the bracket 100. For example, the inner body 118 can be formed of a material that has a modulus of elasticity no greater than that of a material forming a base 110. For example, the inner body 118 can be formed from polycarbonate while the base 110 is formed from steel. Various structures can be used to further modify the flexibility of the inner body 118. In some embodiments, the inner body 118 can be defined by materials having a modulus of elasticity no greater than that of the arch member used in a dental appliance system. In some embodiments, the inner body 118 can have a modulus of elasticity no greater than that of stainless steel, titanium, or nickel steel. The inner body 118 can preferably have a modulus of elasticity of no greater than that of polycarbonate at 37 degrees Celsius.

In at least one embodiment, the inner body 118 can comprise a material that has a modulus of elasticity (measured at 37 degrees C. and conditions typically found in a mouth) of no greater than 175000 megapascals, no greater than 120000 megapascals, no greater than 60000 megapascals. no greater than 25000 megapascals, no greater than 20000 megapascals, no greater than 15000 megapascals, no greater than 10000 megapascals, no greater than 5000 megapascals, no greater than 4000 megapascals, no greater than 3000 megapascals, no greater than 2600 megapascals, no greater than 2200 megapascals, no greater than 2000 megapascals, no greater than 1800 megapascals, no greater than 1500 megapascals, no greater than 1200 megapascals, no greater than 1000 megapascals, no greater than 900 megapascals, no greater than 800 megapascals, no greater than 700 megapascals, no greater than 600 megapascals, no greater than 500 megapascals, no greater than 400 megapascals, no greater than 300 megapascals, no greater than 200 megapascals. The material can have a modulus of elasticity of at least 100 megapascals.

For example, the inner body 118 can be formed from latex, polymeric rubbers, or other polymers such as nitrile, butadiene, styrene butadiene, butyl, chloroprene, ethylene propylene, fluorocarbon, fluorosilicone, hydrogenated nitrile, natural rubber/isoprene, polyacrylate, or silicone. The inner body 118 can also have a resiliency of at least 40%, at least 50%, at least 60%, at least 70%, or at least 80% as measured by ASTM Standard D7121. The inner body 118 can also have a tensile strength of at least 4 MPa, at least 10 MPa, at least 15 MPa, at least 20 MPa, at least 30 Mpa, at least 40 Mpa, at least 50 MPa, at least 60 Mpa, at least 70 Mpa at 37 C according to ASTM D412-15a (Test Method B).

The inner body 118 can allow the outer bracket body 112 to flex in any direction relative to the base 110. For example, the outer body 112 can flex along or about a mesio-distal axis, a labio-lingual axis, or an occluso-gingival axis, or any combination thereof. This can be accomplished mechanically through compression, tension, shear, bending, or torsion. The term flexibility can indicate resiliency and movement of the outer bracket body 112 from a first position to a second position relative to the base 110. For example, taking the facial view of FIG. 1A, the starting position of body 112 is the unstressed position and is the first position. A force applied in the labio-lingual direction will compress or stretch the inner body 118 and cause the outer body 112 to move into a second position. If the outer body 112 returns to the first position, the difference between the first position and the second position along the labio-lingual axis defines the flexibility. If the outer body 112 does not return to the first position (e.g., the inner body 118 reached its fracture or tear point), then the flexibility is not measured.

In at least one embodiment, the second position can be at least 0.1 mm, at least 0.5 mm, at least 1 mm, at least 2 mm, at least 3 mm from the first position along the axis of an applied force.

The inner body 118 can have a thickness measured along a perpendicular axis to the major surface of the tooth 116 that varies according to the application. In some embodiments, the inner body 118 can have a thickness of at least 0.1 mm, however, greater thicknesses will allow for greater deformation and thus greater displacement of the outer body. This thickness can be determined in conjunction with the cross-sectional area, modulus of elasticity, and magnitude and direction of applied force in order to achieve the desired displacement of the outer body as the inner body relaxes. The dimensions of the bracket base, outer body, and arch member, as well as the position of the bracket on the tooth, may be further considered in determining the thickness of the inner body.

In at least one embodiment of the bracket 100, a second inner body can bond to the base 110 and the tooth 116. By adding an additional inner body lower within the bracket 100, more flexibility relative to the tooth 116 is introduced into the distal end of the bracket (i.e., the outer body 112). This can allow the bracket 100 to potentially transmit more force from the slot 114. The second inner body can also serve the function of bonding to the tooth 116 and cure directly on the tooth 116. In this case, the second inner body can differ from other orthodontic adhesives in the relative facial-lingual thickness of the inner body and also the flexibility capabilities introduced relative to the tooth 116 and the base 110.

The bracket 100 can have a height c as measured from the base bottom 110B to the bottom of the slot 118. The height C is typically the in-out distance. In some embodiments, a height can be defined from the topmost surface of the outer body 112.

The height of the bracket 100 will vary depending on the orthodontic application. For example, an incisor that requires major correction can be moved labio-lingually to match the dental arch and may have a greater height than a minor correction. In at least one embodiment, the height of the bracket can be at least 0.2 mm (e.g., at least 0.1 mm for the inner body and at least 0.05 mm for each of the bracket base and the outer body (specifically between the bottom of the slot and the inner body).

In some embodiments, the bracket 100 can be configured for a severe malocclusion and the bracket 100 can be moved labio-lingually toward an arch. The inner body 118 can be under tension.

FIG. 4 illustrates additional dimensions of the inner body of bracket 100. For example, the outer body 112 can be positioned along an axis of rotation in either the gingival or occlusal direction. The axis of rotation varies based on the direction of force from the slot 114 but can generally located within the inner body 118. The compressive force 115 on the inner body 118 is balanced with the elongation force 117. The flanges 111 can help stabilize and anchor the inner body 118 to enable a greater degree of rotation. In some embodiments, the angulation, torque, or in-out of the inner body 118 can be pre-established as discussed herein.

There may be advantages to using elastomeric brackets in conjunction with an arch member made of materials such as a titanium and nickel-titanium and having diameters such as 0.018 inches or 0.022 inches. However, when using elastomeric brackets described herein, the arch member need not be as resilient. The arch member can be made more robust or made of a stiffer material during any phase of treatment, not just in the finishing phase (where slot-filling stainless steel wires are common).

Although depicted as separate elements, the base 110, inner body 118, and the outer body 112 can be formed as a single piece. For example, the base 110, inner body 118, and the outer body 112 can be formed entirely of an elastomeric material sufficient to flex under a load. The bracket 100 can also have sufficient durability to resist tearing. In some configurations, the bracket 100 can be formed of multiple elastomeric materials of varying resilience.

In other implementations, the tooth 116 and can be bonded to an extension of the base 110. The base 110 can be configured to surround the tooth. For example, the base 110 can be molded around a tooth 116 through a measurement and injection molding or three-dimensional printing process. The base 110, inner body 118, and the outer body 112 can optionally be formed as one or more components. For example, the base 110 can be formed by 3D printing from a first (polymeric) material and inner body 118 and the outer body 112 can be formed by 3D printing from a first or second (polymeric) material. The base 110 and body 112 can also be formed from the same material as the inner body 118 so long as the material has sufficient flexibility as described above.

FIGS. 9A-9C illustrates the cross-sectional area of a bracket 900 according to an embodiment of the present disclosure. As shown in FIGS. 9A-9C, the bracket 900 can be similar to the bracket 100 of FIGS. 1A-1B, except that the bracket 900 is shown mounted to a lingual surface of a tooth. Numbering of features and components of bracket 900 generally corresponds to those of the features and components of bracket 100 in FIGS. 1A-1B.

The outer body 912 can have a slot 914 mounted such that an arch member is loaded from the occlusal end of the tooth 916. The slot 914 can be circular-shaped, square-shaped, or rectangular-shaped. At least one of the sides of the slot 914 defines a plane H that the cross-sectional area of the outer body 912 can be taken. The cross-sectional area of the base 910 and inner body can then be determined according to planes parallel to plane H. In at least one example, a square-shaped slot can have a portion that defines a plane H that is substantially parallel to a plane I defined by the base.

A plane G is perpendicular to the plane H and is defined by at least one side of the slot 914. The plane G runs through the point E of the bracket 900 which can be the portion directly underneath the outer body 912, specifically, directly underneath the slot 914. The point E can also be where the base 910 contacts the inner body 918. In some embodiments, the point E can be the midpoint of the bracket where the forces on the bracket are balanced. As shown in FIG. 9C, the plane Q is established for the bracket 900. The plane Q is defined by the midline between the opposing edges (distal and mesial of a tooth). The plane R is defined by a portion of the slot 914 not otherwise defining plane H. The intersection of plane Q and plane R can further define point E.

Plane I can run through points J and K which are defined at opposite edges of the base 910. In some embodiments, points J and K are defined by the intersection of the edge of the base 910 with the tooth 916. In some embodiments, plane I can define the cross-sectional area of the base 910 which is parallel to plane H and/or perpendicular to plane G.

Plane F can be defined by opposite edges of the inner body 918 and run through at least one point E that defines the outermost (toward the lingual direction) point coupling the base 910 and the inner body 918. The base 910 is shown in a convex configuration, thus there is only one outermost point E (already the point of force concentration above), but if concave, then at least one outermost point can exist. The plane F can define the cross-sectional area of the inner body 918 which is parallel to plane H and/or perpendicular to plane G.

Plane L can be defined by opposite edges of the base and run through at least one point that defines the outermost (toward the lingual direction) point coupling the inner body 918 to the outer body 912. The plane L can define the cross-sectional area of the body which is parallel to plane H and/or perpendicular to plane G.

The cross-sectional area (defined herein) of the base 110, the inner body 118, and body 112 are relative. Although FIGS. 1A-1B show that the base 110 has a larger cross-sectional area than the inner body 118 and the outer body 112, various configurations are possible. For example, the base 110 can have the same or lesser cross-sectional area than the inner body 118 or the outer body 112. In an embodiment, the cross-sectional area of the outer body 112 is no greater than that of the inner body 118.

In at least one embodiment, the base 110 can have a first cross-sectional area, the outer body 112 can have a second cross-sectional area, and the inner body 118 can have a third-cross sectional area. In some embodiments, if non-uniform, the cross-sectional area can be measured based on the thickest portion. For example, the third cross-sectional area can be measured from a layer that is parallel to the tooth 116 and including the flange. The third cross-sectional area can be at least 25%, at least 35%, at least 45%, at least 55%, at least 65%, at least 75%, at least 85%, at least 90%, at least 95%, at least 105% of the first or second cross sectional area. The second cross-sectional area can be at least 5%, at least 10%, at least 20%, at least 30%, at least 40%, at least 50%, at least 60%, at least 70%, or at least 80% of the first cross-sectional area. The second cross-sectional area can be no greater than 100%, no greater than 90% of the first cross-sectional area.

In some embodiments, the inner body 118 can also be defined by the relative thickness relative to various components of the bracket 100. The thickness of a component can be measured from the thinnest section of the component. For example, the base 110 can have a first thickness measured from the thinnest section. The inner body 118 can have a second thickness. In some embodiments, the second thickness is at least the first thickness. The second thickness can also be at least 105%, at least 110%, at least 120%, or at least 125% of the first thickness.

Figure 2:
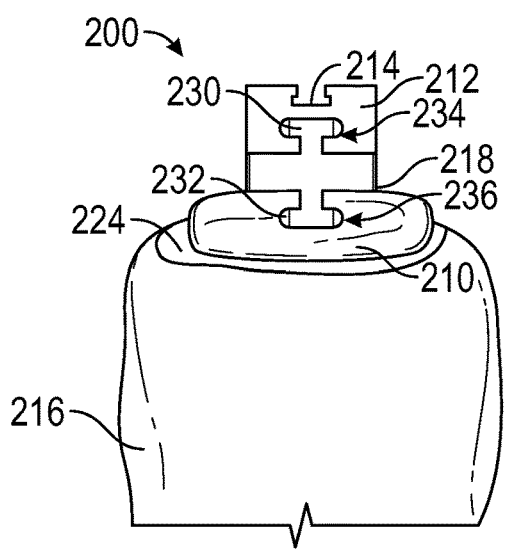
FIG. 2 illustrates a lateral view of an orthodontic bracket with an interlocking protrusion.

As illustrated by FIGS. 2-4, the inner bodies 218, 318, 418 can include a variety of configurations with respect to the inner body 118 of FIGS. 1A-1B. FIG. 2 illustrates a bracket 200 according to an embodiment of the present disclosure. As shown in FIG. 2, the bracket 200 can be similar to the bracket 100 of FIGS. 1A-1B, except that the bracket 200 includes at least one protrusion to facilitate adhesion of the inner body. Please refer to corresponding elements and features in the illustrated embodiment of FIGS. 1A-1B for a more complete description of the features and elements (and alternatives to such features and elements) of the embodiment illustrated in FIG. 2.

The inner body 218 can have a plurality of protrusions that at least partially interlock with the outer body 212 or the base 210, including a first protrusion 230 and a second protrusion 232. The protrusions can be continuous along the outer body 212, the base 210, or both. The first protrusion 230 can mate with a first recessed area 234 on the outer body 212 and the second protrusion 232 can mate with a second recessed area 236 on the base 210. The mating secures the inner body 218 and improves the adhesion to both the outer body 212 and the base 210. The mating can be further secured with adhesive. The first and second protrusions are carried through the length of the bracket 200. At least one of the protrusions may be optional. For example, the second protrusion can be omitted and the inner body 218 can be bonded to the base 210 using adhesive.

FIG. 3 illustrates a bracket 300 according to an embodiment of the present disclosure. As shown in FIG. 3, the bracket 300 can be similar to the bracket 100 of FIGS. 1A-1B, except that the bracket 300 includes an inner body 318 that at least partially contacts a side of both the base 310 and outer body 312. Numbering of features and components of bracket 300 generally corresponds to those of the features and components of bracket 100 in FIGS. 1A-1B.

The inner body 318 can have at least one contacting section. For example, inner body 318 can have a first elastomeric section 319 and a second elastomeric section 320. The first elastomeric section 319 can at least partially contact the second surface 312B in addition to contacting the first surface 312A. The first elastomeric section 319 can be defined by the third surface 312C. In some configurations, the first elastomeric section 319 is flush with the third surface 312C meaning that the first elastomeric section 319 does not substantially extend outward from the tooth 316 beyond the plane defined by the third surface 312C. Thus, the first elastomeric section 319 can continuously contact at least one major surface 312B of the outer body 312 (or two or more surfaces including the first surface 312A). Preferably, the sides of the outer body 312 are covered by the inner body 318 and the inner body 318 is flush with the top of the outer body 312 with the slot 314.

The continuous contact may promote additional adhesion between the inner body 318 and other components (e.g., the outer body 312) of the bracket 300 as well as allow the other components to resist spontaneous detachment. As shown, the outer body 312 and base 310 are coupled to and/or formed with the elastomeric section, but the outer body 312 and 310 can also be embedded in the elastomeric section.

The second elastomeric section 320 can function in a similar manner to the first elastomeric section 319 except the second elastomeric section at least partially contacts or even fully covers the second surface 310B of the base 310. In some configurations, the second elastomeric section 320 can envelop at least one major surface (i.e., the second surface 310B) of the base 310. The second elastomeric section 320 can also extend across the plane of the tooth 316 flush with the plane of the tooth 316. The base 310 can be further adhered to the tooth 316 by an adhesive 324. In embodiments, the adhesive 324 can be made out of the same material as either of the elastomeric sections (e.g., 318 or 320). Either the first or the second elastomeric section can be considered optional depending on the orthodontic application. In at least one embodiment, the first elastomeric section is meant to be integrated with the second elastomeric section.

In some embodiments, the inner body can be formed as part of a kit. The kit can include an inner body, an outer body, and/or a bracket base. In some embodiments, it can be advantageous to use separate components as the bracket body and bracket base can be uniform while the inner body can be made of one or more unique dimensions in order to customize the bracket using economies of scale.

A method of making an orthodontic bracket can include receiving one or more dimensions of a bracket body and a bracket base. The method can also include determining one or more dimensions of an inner body based on the one or more dimensions of the bracket body and the bracket base. For example, the bracket body or the bracket base can be configured to secure an inner body such as shown on FIG. 2 or FIG. 3. The inner body can be formed based on the one or more dimensions of the inner body.

The forming the inner body can occur using injection molding or even three-dimensional printing. Injection molding may be preferred due to the tighter tolerances. For example, a mold may be formed based on the one or more dimensions of the inner body. Materials for the inner body are described herein. The material can be added, cured, and removed from the mold.

The resulting inner body can have the one or more dimensions, e.g., in-out, angulation, inclination, torque, tip, and combinations thereof. The inner body can be coupled to the bracket body or coupled to the bracket base.

Figure 6:
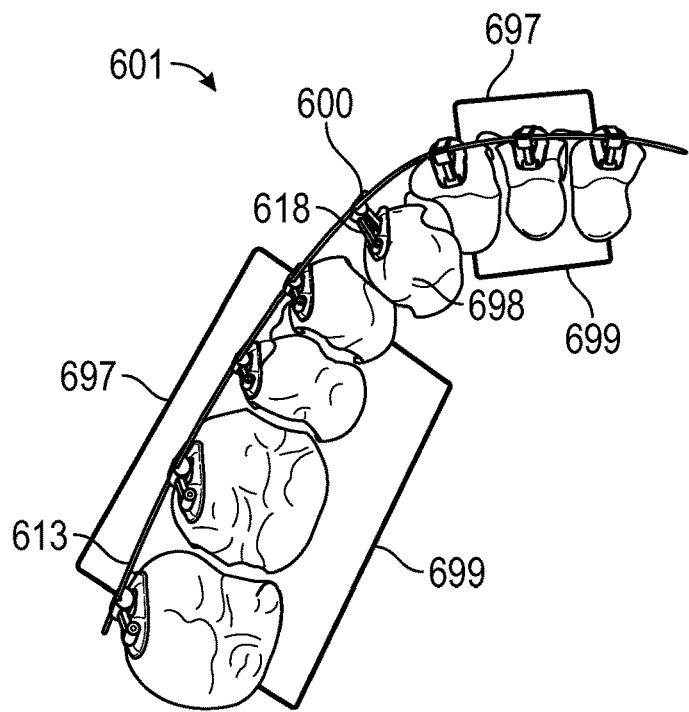
FIG. 6 illustrates an occlusal view of a system of orthodontic brackets along with an arch member.

As shown in FIGS. 5A-5B, the bracket 500 can be similar to the bracket 100 of FIGS. 1A-1B, except that an extension of the base 515 is shown adjacent to a tooth 516. Numbering of features and components of bracket 500 generally corresponds to those of the features and components of bracket 100 in FIGS. 1A-1B. The bracket 500 is shown on the lingual side of the tooth 516 and can include an arch member 513 that is adjacent to the slot 514. The base 510 is shown non-rectangular and substantially trapezoidal. Even though the inner body 518 is shown having a cross sectional area that is less than that of the base 510, the opposite is possible (which can also add stability). The base 510 comprises a base extension 515 which can be molded to the base such that a bracket is attached securely. The inner body 518 can be secured to the base 510 and/or the base extension 515 (also can be referred to as a polymeric shell portion) using a variety of fastening means, including mechanical or adhesive means to further secure the inner body 518. The base extension 515 can be customized to the surface of the tooth 516 and be further held in place by an adhesive such as a dental adhesive, FIG. 6 illustrates a type of tooth adjustment useful by a bracket 600 which has components similar to that in bracket 100 in FIGS. 1A-1B. The dental appliance 601 can be configured to adjust an upper right cuspid 698 that is distal to a patient's ideal arch form. The dental appliance 601 can have one or more orthodontic brackets 697 that are facially attached to the group of teeth 699 comprising the upper right first and second bicuspids, upper right first and second molars, upper right lateral, upper right central, and upper left central teeth. The dental appliance 601 can also have the bracket 600 attached to the upper right cuspid 698.

The bracket 600 can have an inner body 618 that provides extra in/out dimensions relative to one or more orthodontic brackets 697. The brackets 697, 600 can be secured to the arch member 613. The bracket 600 can be configured to receive traction from the inner body in order to translate the tooth 698. For example, the bracket 600 height can be less than the distance from the arch member 613 to the bracket 600 which causes elongation in the inner body. The elongation force applied to the bracket 600 can be at least 15 grams, at least 25 grams, at least 50 grams, at least 75 grams, at least 100 grams, at least 125 grams, or at least 150 grams. The force applied to the bracket 600 may also be no greater than 1000 grams in any direction.

Figure 7:
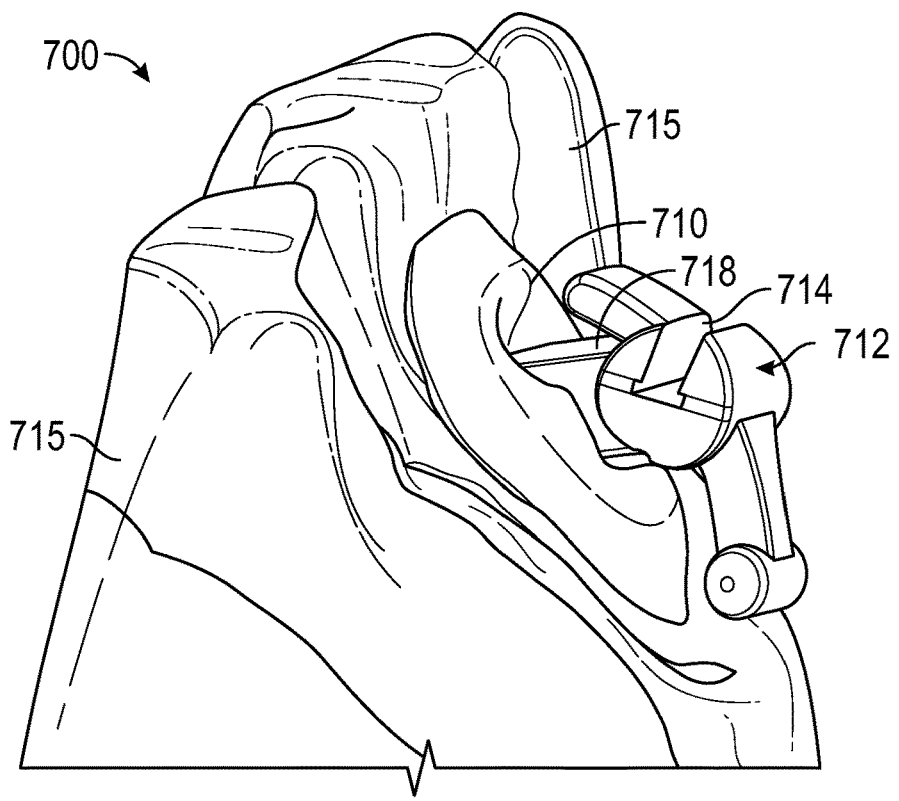
FIG. 7 illustrates an oblique view of an orthodontic bracket incorporating an inner body, mounted on the lingual surface of a lower incisor, looking towards its lingual-distal side.

FIG. 7 illustrates an embodiment of a bracket 700 which has components similar to the bracket 100 of FIGS. 1A-1B, except that base 710 includes a base extension 715. The outer body 712 has a bracket slot 714. The inner body 718 secures the outer body 712 to the base 710. The base 710 is molded into a tooth shell substrate 715 (thus the base 710 forms at least part of the tooth shell substrate 715 and is integral with the base 710) that conforms to a tooth.

Figure 8A:
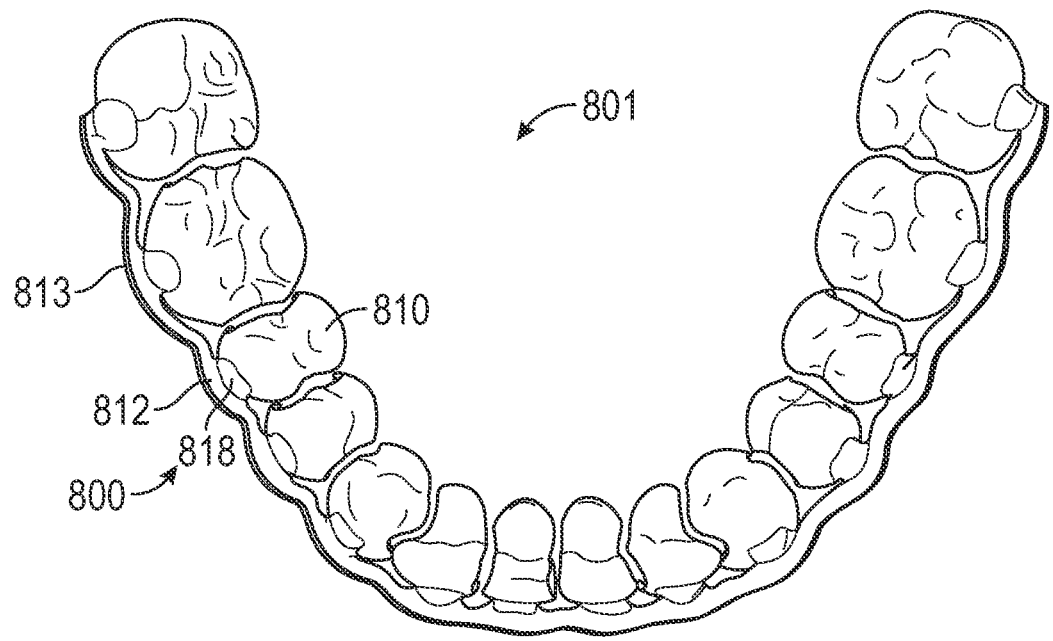
FIG. 8A illustrates a gingival elevational view of a dental appliance with an inner body, looking towards its gingival direction.
Figure 8B:
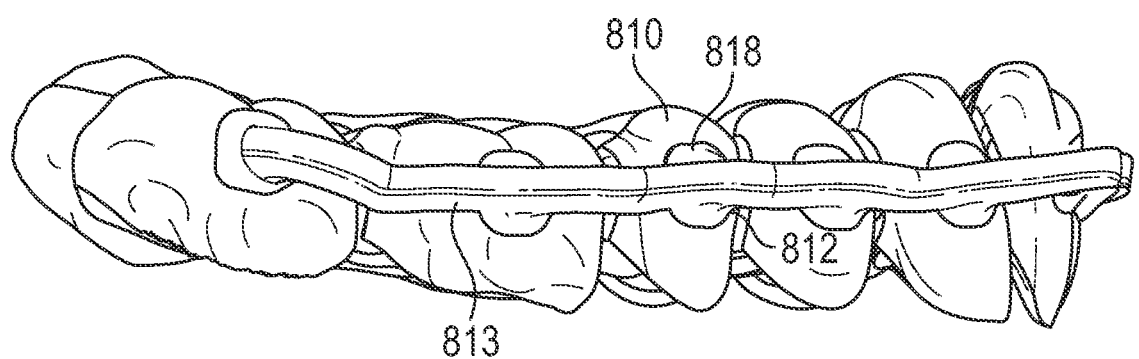
FIG. 8B illustrates a right lateral view of a dental appliance with an inner body.

FIGS. 8A-8B illustrates an embodiment of a plurality of brackets 800 that are integrated into an appliance 801. The appliance 801 can be a removable dental appliance which includes a plurality of polymeric shell portions each having one or more cavities shaped therein to receive one or more teeth. Each of the plurality of shell portions is formed to be separate from the other plurality of shell portions. A shell portion can be an extension of a base of an orthodontic bracket. The appliance 801 can also include one or more of the brackets 800 described herein. In some embodiments, the base described herein comprises a base extension or a polymeric shell portion.

The appliance 801 can also have an arch member 813 coupled to the orthodontic bracket 800. The plurality of shell portions can also have one or more shell portions that are coupled to
each other, such as through the arch member 813. As discussed herein, the arch member 813 provides one or more forces to reposition one or more teeth from first orientations to successive orientations.

An aspect of the appliance 801 is that the polymeric shell portion, and the orthodontic bracket are a single piece, meaning that the bracket base forms the polymeric shell portion as a continuous, integral article (or appliance). The inner body 818 can be made of a first polymer while the outer body 812, base/polymeric shell portion 810 can be made of a second polymer. As described herein, the orthodontic bracket can be created using any layered deposition technique. The result would be gradual layers of elastomeric material disposed between the base and the outer body 812. The arch member can also be formed as a single piece with the bracket 800 and the polymeric shell portion/base 810.

The appliance 801 can have the bracket 800 attached to the appliance's lingual side, labial side, or both. The robustness of the arch member 813 is related to a resiliency of the orthodontic bracket 800. The arch member 813 can be formed from a polymer and, as described herein, the inner body can have a modulus of elasticity no greater than a modulus of elasticity of the arch member. The arch member 813 can be selected such that the arch member has a lower fracture point than yield point. Suitable materials are able to withstand three dimensional printing applications such as polyurethane resin and (meth)acrylate resin.

The appliance 801 could also have a cut-out formed from the polymeric shell portion and sufficient to leave at least part of a tooth exposed that conforms to a tooth. For example, the cut-out can expose at least 50% of the occlusal surface area of the tooth.

The appliance 801 can be formed by forming, from a first polymeric material, a plurality of shell portions each having at least one cavity shaped to receive one or more teeth of a user and a spacing portion (as discussed in FIGS. 10-14). The appliance 801 can also be formed by forming, from a second polymeric material, an arch member, wherein the removable dental appliance is formed as a single piece.

The second polymeric material can be the same as the first polymeric material. The first polymeric material can be a poly (meth) acrylate while the second polymeric material comprises one or more multi-functional urethane (meth) acrylates.

To adjust one or more teeth, a user can receive a dental structure of a patient, determine a modification to the dental structure based on the arch member, and form the removable dental appliance 801 based on the dental structure (as discussed in FIGS. 10-14). For example, a computer can determine the modification by determining dimensions and shapes of a removable dental appliance based on time and/or forces required to modify the dental structure from an initial position to an adjusted position when the removable dental appliance is worn by the patient. Once formed, (if formed as separate components) the user can also attach the orthodontic bracket 800 to the tooth such as tooth in a location sufficient to perform the modification. The user can further coupled the arch member to the orthodontic bracket.

FIGS. 10-14 illustrate the digital design and planning treatment of various aspects of shell portions disclosed herein.

Figure 10:
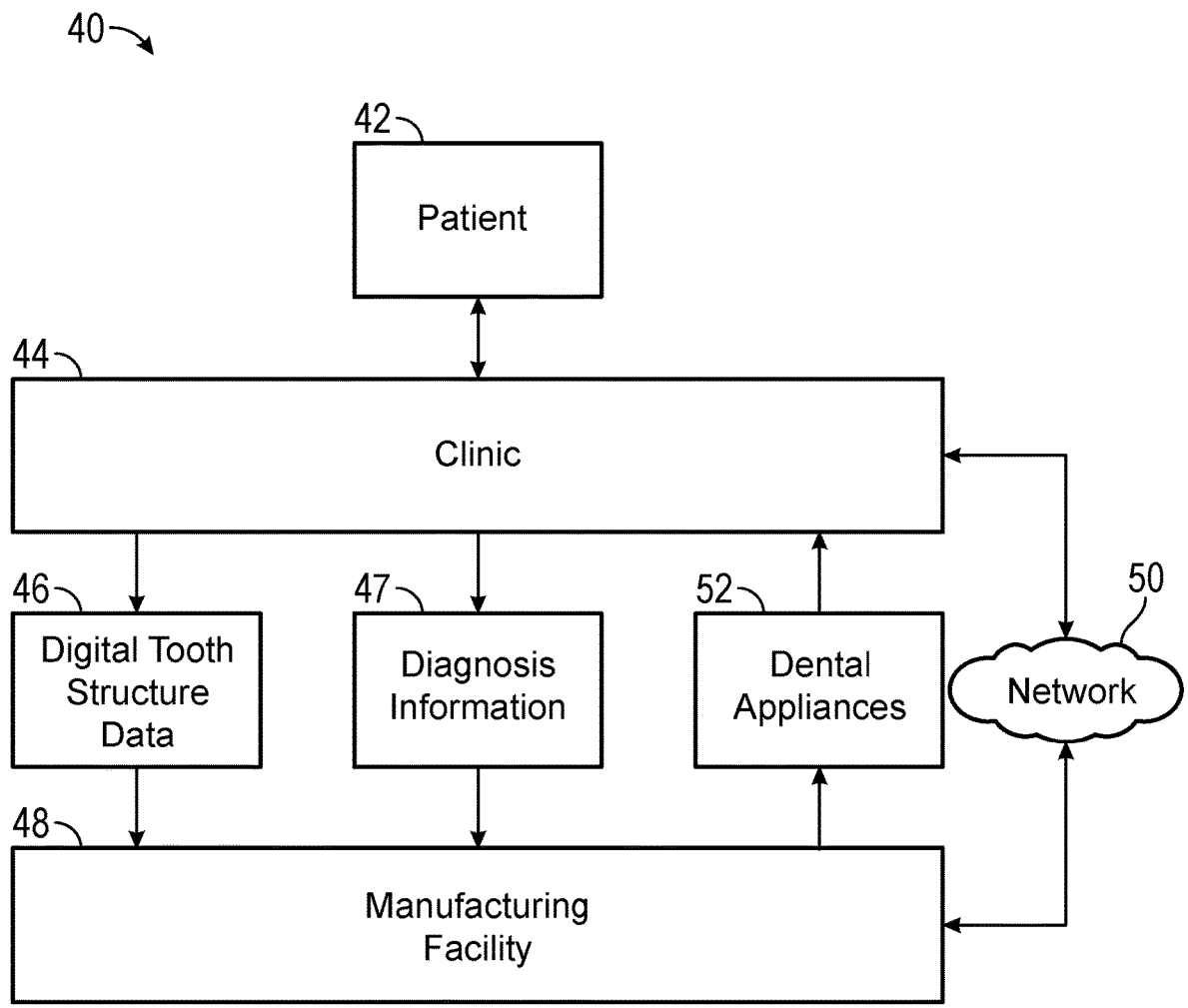
FIG. 10 is a block diagram illustrating an example computer environment in which a clinic and manufacturing facility communicate information throughout a dental appliance manufacturing process.

FIG. 10 is a block diagram illustrating an example computer environment 40 in which clinic 44 and manufacturing facility 48 communicate information throughout a manufacturing process of a set of removable dental appliances 52 for patient 42. Initially, an orthodontic practitioner of clinic 44 generates one or more images of a dental structure of patient 42 using any suitable imaging technique and generates digital dental structure data 46 (e.g., a digital representation of patient's 42 tooth structure). For example, the practitioner may generate x-ray images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of 3D data acquisition. In other embodiments, the digital images may be provided using a hand-held intra-oral scanner such as the intra-oral scanner using active wavefront sampling developed by Brontes Technologies, Inc. (Lexington, MA) and described in PCT Publication No. WO 2007/084727 (Boerjes, et al.). Alternatively, other intra-oral scanners or intra-oral contact probes may be used. As another option, the digital structure data 46 may be provided by scanning a negative impression of the patient's teeth. As still another option, the digital structure data 46 may be provided by imaging a positive physical model of the patient's teeth or by using a contact probe on a model of the patient's teeth. The model used for scanning may be made, for example, by casting an impression of a patient's dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.).

In addition to providing digital images by scanning the exposed surfaces of the teeth, it is possible to image hidden features of the dentition, such as the roots of the patient's teeth and the patient's jaw bones. In some embodiments, the digital tooth structure data is formed by providing several three-dimensional (3D) images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), and U.S. Patent Publication No. 2004/0029068 (Badura et al.), Issued U.S. Pat. No. 7,027,642 (Imgrund et al.), and U.S. Pat. No. 7,234,937 (Sachdeva, et al.) describe using techniques of integrating digital images provided from various 3D sources. Accordingly, the term "imaging" as it is used herein is not limited to normal photographic imaging of visually apparent structures, but includes imaging of dental structures that are hidden from view. The dental structure may include, but is not limited to, any portion of crowns and/or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

In order to generate digital tooth structure data 46, a computer transforms raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. In order for this data to be useful in orthodontic diagnosis and treatment, the computer may "segment" dentition surfaces to produce one or more discrete, movable 3D tooth object models representing individual teeth. The computer may further separate these tooth models from the gingiva into separate objects. Segmentation allows a user to characterize and manipulate the teeth arrangement as a set of individual objects. Advantageously, the computer may derive diagnostic information such as arch length, bite setting, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental structure data 46, clinic 44 may store digital dental structure data 46 within a patient record in a database. Clinic 44 may, for example, update a local database having a plurality of patient records. Alternatively, clinic 44 may remotely update a central database (optionally within manufacturing facility 48) via network 50. After digital tooth structure data 46 is stored, clinic 44 electronically communicates digital dental structure data 46 to manufacturing facility 48. Alternatively, manufacturing facility 48 may retrieve digital dental structure data 46 from the central database.

Clinic 44 may also forward prescription data 47 conveying general information regarding a practitioner's diagnosis and treatment plan for patient 42 to manufacturing facility 48. In some examples, prescription data 47 may be more specific. For example, digital dental structure data 46 may be a digital representation of the dental structure of patient 42, and the practitioner of clinic 44 may review the digital representation and indicate desired movement, spacing or final positions of individual teeth of patient 42 following treatment with the set of removable dental appliances 52 prior to forwarding digital dental structure data 46 to manufacturing facility 48. Manufacturing facility 48 may be located off-site, or located with clinic 44.

For example, each clinic 44 may include its own equipment for manufacturing facility 48 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental structure of patient 42 through additive printing. The 3D printer may use iterative digital designs of original dental structure of patient 42 as well as a desired dental structure of patient 42 to produce multiple digital appliances and/or digital appliance patterns customized to produce the desired dental structure of patient 42. Manufacturing may include post-processing to remove uncured resin and remove support structures, or to assemble various components, which may also be necessary and could also be performed in a clinical setting.

Manufacturing facility 48 utilizes digital dental structure data 46 of patient 42 to construct the set of removable dental appliances 52 in order to reposition teeth of patient 42. Sometime thereafter, manufacturing facility 48 forwards the set of removable dental appliances 52 to clinic 44 or, alternatively, directly to patient 42. For example, the set of removable dental appliances 52 may be an ordered set of removable dental appliances. Patient 42 then wears the removable dental appliances in the set of removable dental appliances 52 sequentially over time according to a prescribed schedule in order to reposition the teeth of patient 42. For example, patient 42 may wear each removable dental appliance in the set of removable dental appliances 52 for a period of between about 2 weeks and about 12 weeks, such as between about 3 weeks and about 10 weeks or between about 4 weeks and about 8 weeks. Optionally, patient 42 may return to clinic 44 for periodic monitoring of the progress of the treatment with removable dental appliances 52.

During such periodic monitoring, a clinician may adjust the prescribed schedule of patient 42 for wearing the removable dental appliances in the set of removable dental appliances 52 sequentially over time. Monitoring generally includes visual inspection of the teeth of patient 42 and may also include imaging to generate digital tooth structure data. In some relatively uncommon circumstances, the clinician may decide to interrupt the treatment of patient 42 with the set of removable dental appliances 52, for example, by sending the newly generated digital dental structure data to manufacturing facility 48 in order to produce a new set of removable dental appliances. In the same or different examples, the clinician may send newly generated digital dental structure data to manufacturing facility 48 following the completion of the prescribed schedule of the treatment with removable dental appliances 52. In addition, following the completion of the prescribed schedule of the treatment with removable dental appliances 52, the clinician may request a new set of removable dental appliances from manufacturing facility 48 to continue treatment of patient 42.

Figure 11:
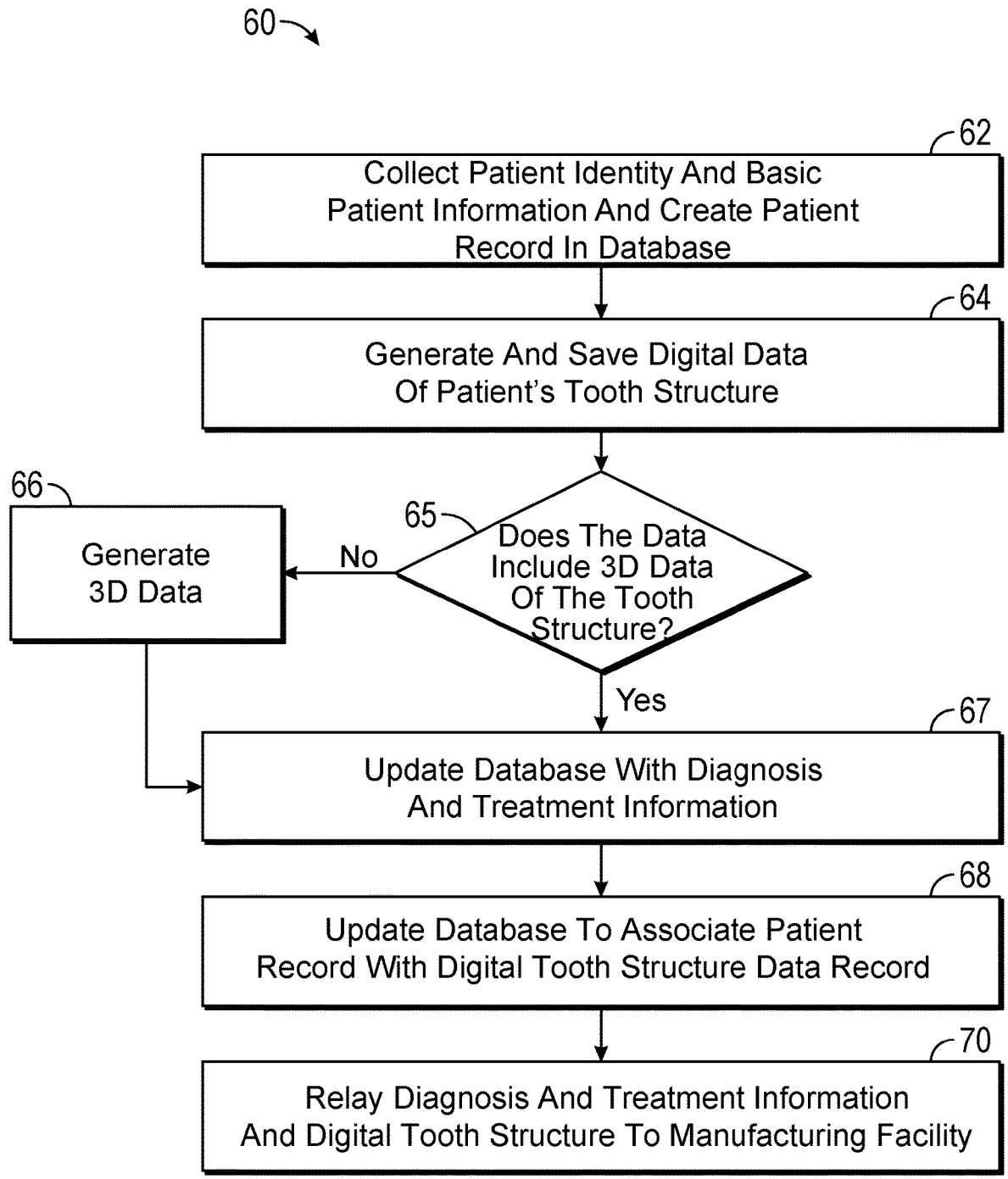
FIG. 11 is a flow diagram illustrating a process conducted at the clinic in accordance with one example of this disclosure.

FIG. 11 is a flow diagram illustrating process 60 conducted at clinic 44 in accordance with one example of this disclosure. In block 62, a practitioner at clinic 44 collects patient identity and other information from patient 42 and creates a patient record. As described, the patient record may be located within clinic 44 and optionally configured to share data with a database within manufacturing facility 48. Alternatively, the patient record may be located within a database at manufacturing facility 48 that is remotely accessible to clinic 44 via network 50 or within a database that is remotely accessible by both manufacturing facility 48 and clinic 44.

In block 64, digital data 46 of the dental structure of patient 42 may be generated and saved using any suitable technique to thereby create a virtual dental structure. Digital data 46 may be comprised of a two-dimensional (2D) image and/or a three-dimensional (3D) representation of the dental structure.

In one example, 3D representations of a dental structure are generated using a cone beam computerized tomography (CBCT) scanner, such as an i-CAT 3D dental imaging device, which is available from Imaging Sciences International, LLC; 1910 N Penn Road, Hatfield, PA Clinic 44 stores the 3D data 46 (in the form of radiological images) generated from the CBCT scanner in the database located within clinic 44, or alternatively, within manufacturing facility 48. The computing system processes the digital data 46 from the CBCT scanner, which may be in the form of a plurality of slices, to compute a digital representation of the tooth structure that may be manipulated within the 3D modeling environment.

In block 65, the computing system can determine whether the data includes 3D data of the tooth structure. If not, the practitioner may further generate 3D digital data in block 66. The 3D data 46 may be produced by, for example, forming and subsequently digitally scanning a physical impression or casting of the tooth structure of patient 42. For example, a physical impression or casting of a dental arch of patient 42 may be scanned using a visible light scanner, such as an OM-3R scanner available from Laser Design, Inc. of Minneapolis, MN Alternatively, the practitioner may generate the 3D data 46 of the occlusal service by use of an intra-oral scan of the dental arch of patient 42, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, may be used. In the same or different examples, techniques for defining a virtual tooth surface and virtual tooth coordinate system as described in U.S. Patent Application Publication No. 2013/0325431, titled ORTHODONTIC DIGITAL SETUPS," and published on Dec. 5, 2013 may be used. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the tooth structure of patient 42 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low resolution image of the roots obtained from a CBCT scanner (e.g., an i-CAT 3D dental imaging device) and the second 3D digital representation may be a relatively high resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software, available from 3D Systems, Inc.; 333 Three D Systems Circle, Rock Hill, SC), or alternatively, registration techniques described in U.S. Pat. No. 8,491,306 may be used.

If the data includes 3D data of the tooth structure in block 65, then the process 60 can continue to block 67. In block 67, a computer system can update the database with diagnosis and treatment information. A computer system executing 3D modeling software renders a resultant digital representation of the tooth structure, including the occlusal surface as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the desired final positions or the teeth of patient 42. In block 68, a database is updated to associate patient records with the digital tooth structure data records. For example, once the practitioner has finished conveying general information regarding a diagnosis and treatment plan within the 3D environment, the computer system updates the database associated with the patient record to record the prescription data 47 conveying general information regarding a diagnosis and treatment plan as specified by the practitioner.

In block 69, the prescription data 47 (e.g., the diagnosis and treatment information and digital tooth structure) is relayed to manufacturing facility 48 in order for manufacturing facility 48 to construct one or more removable dental appliances, such as removable dental appliances 52.

Although described with respect to an orthodontic practitioner located at an orthodontic clinic, one or more of the steps discussed with respect to process 60 may be performed by a remote user, such as a user located at manufacturing facility 48. For example, the orthodontic practitioner may only send radiological image data and an impression or casting of the patient to manufacturing facility 48, where a user interacts with a computer system to develop a treatment plan within a 3D modeling environment.

Optionally, a digital representation of the treatment plan within the 3D modeling environment may then be transmitted to the orthodontic practitioner of clinic 44, who may review the treatment plan and either send back his or her approval, or indicate desired changes.

Figure 12:
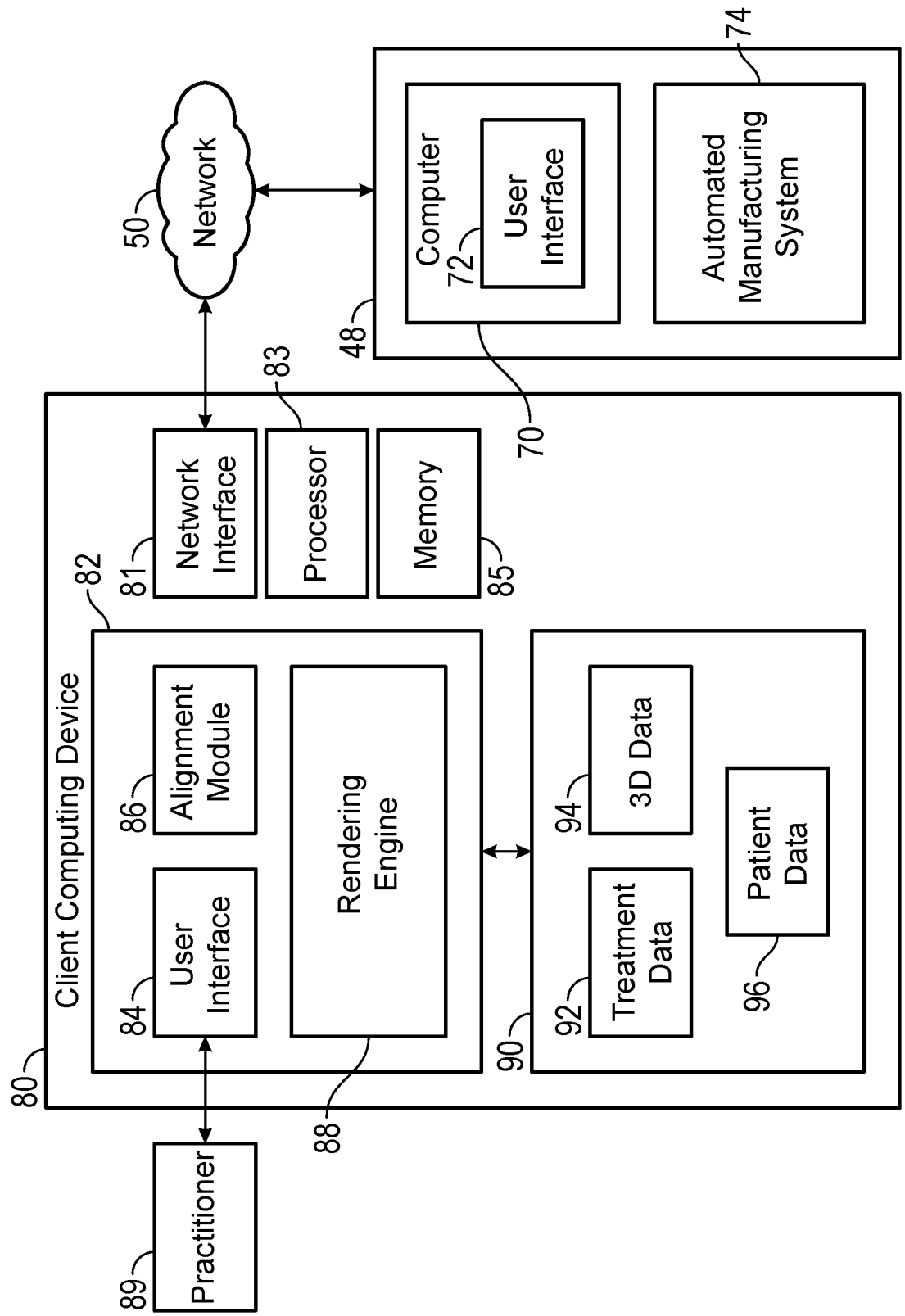
FIG. 12 is a block diagram illustrating an example of a client computing device connected to a manufacturing facility via a network.

FIG. 12 is a block diagram illustrating an example of a client computing device 80 connected to manufacturing facility 48 via network 50. In the illustrated example, client computing device 80 provides an operating environment for modeling software 82. Modeling software 82 presents a modeling environment for modeling and depicting the 3D representation of the teeth of patient 42. In the illustrated example, modeling software 82 includes user interface 84, alignment module 86, and rendering engine 88.

User interface 84 provides a graphical user interface (GUI) that visually displays the 3D representation of patient's 42 teeth. In addition, user interface 84 provides an interface for receiving input from practitioner 89 of clinic 44 (FIG. 10), e.g., via a keyboard and a pointing device, for manipulating patient's 42 teeth within the modeled dental arch.

Modeling software 82 may be accessible to manufacturing facility 48 via network interface 81. Modeling software 82 interacts with database 90 to access a variety of data, such as treatment data 92, 3D data 94 relating to the tooth structure of patient 42, and patient data 96. Database 90 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computing device 80, database 90 may be located remote from the client computing device and coupled to the client computing device via a public or private network, e.g., network 50.

Treatment data 92 describes a diagnosis and/or repositioning information of the teeth of patient 42 selected by practitioner 89 and positioned within the 3D modeling environment. Patient data 96 describes a set of one or more patients, e.g., patient 42, associated with practitioner 89. For example, patient data 96 specifies general information, such as a name, date of birth, and a dental history, for each patient.

Rendering engine 88 accesses and renders 3D data 94 to generate the 3D view presented to practitioner 89 by user interface 84. More specifically, 3D data 94 includes information defining the 3D objects that represent each tooth (optionally including roots), and jaw bone within the 3D environment. Rendering engine 88 processes each object to render a 3D triangular mesh based on viewing perspective of practitioner 89 within the 3D environment. User interface 84 displays the rendered 3D triangular mesh to practitioner 89, and allows practitioner 89 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein.

Client computing device 80 includes processor 83 and memory 85 in order to store and execute modeling software 82. Memory 85 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 83 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 85 may store program instructions (e.g., software instructions) that are executed by processor 83 to carry out the techniques described herein. In other examples, the techniques may be executed by specifically programmed circuitry of processor 83. In these or other ways, processor 83 may be configured to execute the techniques described herein.

Client computing device 80 is configured to send a digital representation of a 3D tooth structure of a patient, and optionally, treatment data 92 and/or patient data 96 to computer 70 of manufacturing facility 48 via network 50. Computer 70 includes user interface 72. User interface 72 provides a GUI that visually displays the 3D representation of the digital model of teeth. In addition, user interface 72 provides an interface for receiving input from a user, e.g., via a keyboard and a pointing device, for manipulating a patient's teeth within the digital representation of the 3D tooth structure of the patient.

Computer 70 may further be configured to determine dimensions and shapes of a set of removable dental appliances for the patient, the dimensions and shapes of the removable dental appliance being configured to reposition the one or more teeth of the patient from their initial positions to adjusted positions when the removable dental appliances are worn by the patient. Computer 70 may provide the dimensions and shapes of the set of removable dental appliances for the patient to automated manufacturing system 74 for production of the set of removable dental appliances.

Client computing device 80 and computer 70 are merely conceptual representations of an example computer system. In some examples, the functionalities described with respect to those of client computing device 80 and/or computer 70 may be combined into a single computing device or distributed among multiple computing devices within a computer system. For example, cloud computing may be used for digital design of dental appliances described herein. In one example, the digital representations of tooth structures are received at one computer at the clinic, while a different computer, such as computer 70, is used to determine the shapes and dimensions of a dental appliance. In addition, it may not be necessary for that different computer, such as computer 70, to receive all of the same data in order for it determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computing device 80 and computer 70, or otherwise utilized to design a custom dental appliance may be significantly less than the complete data set representing a complete digital dental model of a patient.

Figure 13:
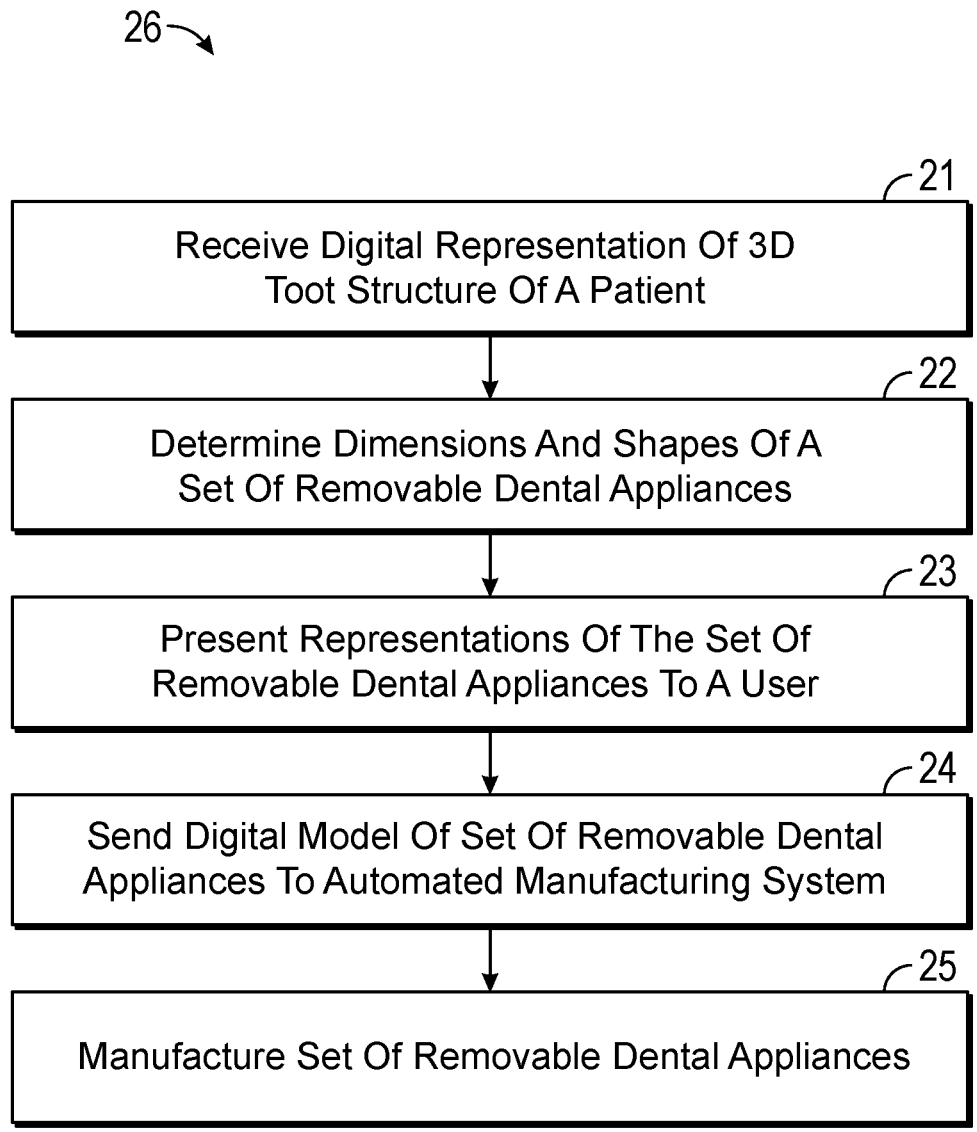
FIG. 13 is a flow diagram illustrating a process conducted at a manufacturing facility for construction of a set of removable dental appliances.

FIG. 13 is a flow diagram illustrating process 26 conducted at manufacturing facility 48 for construction of removable dental appliances 52. In some examples, removable dental appliances 52 may include one or more of removable dental appliances such as those discussed herein.

In block 21, a computer 70 at manufacturing facility 48 receives digital tooth structure data 46, from patient 42 via clinic 44, thus providing initial positions of one or more teeth of the patient, and prescription data 47 from clinic 44. Alternatively, computer 70 retrieves the information from a database located within or otherwise accessible by computer 70. A trained user associated with computer 70 may interact with a computerized modeling environment running on computer 70 to develop a treatment plan relative to the digital representation of the patient's tooth structure and generate prescription data 47, if clinic 44 has not already done so. In other examples, computer 70 may automatically develop a treatment plan based solely on the patient's tooth structure and predefined design constraints.

In block 22, the computer 70 determines dimensions and shapes of a removable dental appliance for the patient. The dimensions and shapes of the removable dental appliance are configured to reposition the one or more teeth of the patient from their initial positions to adjusted positions when the removable dental appliance is worn by the patient. In the same or additional examples, computer 70 determines dimensions and shapes of a set of removable dental appliances for the patient, the set of removable dental appliances for the patient being configured to be worn in series.

In some examples, determining dimensions and shapes of the removable dental appliance includes selecting, with computer 70, the dimensions and shapes of the removable dental appliance according to a set of predefined design constraints. The set of predefined design constraints may include one or more factors, including, but not limited to, a maximum localized force applied to one or more of the surrounded teeth, a maximum rotational force applied to one or more of the surrounded teeth, a maximum translational force applied to one or more of the surrounded teeth, a maximum total force applied to one or more of the surrounded teeth, and a maximum strain applied to the removable dental appliance when worn by the patient when the surrounded teeth are in their initial positions.

Computer 70 may use Finite Element Analysis (FEA) techniques to analyze forces on a patient's teeth as well as the removable dental appliance during the determination of the dimensions and shapes of the removable dental appliance. For example, computer 70 may apply FEA to a solid model of the patient's teeth as the modeled teeth move from their initial positions to their final positions representing a treatment including an ordered set of removable dental appliances. Computer 70 may use FEA techniques to select an appropriate removable dental appliance to apply the desired forces on the teeth. In addition, computer 70 may use a virtual articulator to determine contact points between the teeth throughout the movement of the modeled teeth during the treatment. Computer 70 may further include occlusal contact forces, such as interdigitation forces, in the FEA forces analysis in combination with forces from device during the design of removable dental appliances in an ordered set of removable dental appliances.

In the same or different examples, determining dimensions and shapes of the removable dental appliance includes selecting, with computer 70 thicknesses of the facial portion and the lingual portion of the dental appliance body in order to provide a stiffness suitable to reposition the one or more teeth of the patient from their initial positions to adjusted positions when the removable dental appliance is worn by the patient. In different examples, such selected thickness may range between about 0.25 millimeters and about 2.0 millimeters thick, such as between about 0.5 and about 1.0 millimeters thick. In some examples, computer 70 may further select a material of at least a portion of the removable dental appliance (e.g., the facial and lingual body portions) according to the predefined design constraints or to provide a desired stiffness characteristic without necessarily increasing the thickness.

In block 23, the dimensions and shapes of a removable dental appliance for the patient may be presented to a user via user interface 72 of computer 70. In examples in which dimensions and shapes of the removable dental appliance are presented to a user via user interface 72 of computer 70, the user may have the opportunity to adjust the design constraints or directly adjust the dimensions and shapes of the removable dental appliance before the design data is sent to automated manufacturing system.

In block 23, alternatively or additionally, the dimensions and shapes of a removable dental appliance for the patient may be presented to a user by computer 70 directly as the removable dental appliance manufactured by automated manufacturing system 74. In such examples, computer 70 sends a digital model of the removable dental appliance to automated manufacturing system 74, and automated manufacturing system 74 manufactures the removable dental appliance according to the digital model from computer 70.

In block 24, computer 70, following user approval, sends a digital model of the removable dental appliance to automated manufacturing system 74 (even in examples where the dimensions and shapes of a removable dental appliance for the patient may be presented to a user via user interface 72 of computer 70).

In block 25, an automated manufacturing system 74 manufactures the removable dental appliance according to the digital model from computer 70.

In some examples, automated manufacturing system 74 may include a 3D printer. The techniques of process 26 may be applied to the design and manufacture of each of an ordered set of removable dental appliances for the patient. For example, each removable dental appliance in the ordered set of removable dental appliances may be configured to incrementally reposition the teeth of the patient. In this manner, the ordered set of removable dental appliances may be configured to reposition the teeth of the patient to a greater degree than any one of the removable dental appliances within the set of the removable dental appliances. Such an ordered set of removable dental appliances for the patient may specifically be configured to incrementally reposition the one or more teeth of the patient from their initial positions to final adjusted positions as the removable dental appliances of the ordered set of removable dental appliances for the patient are worn sequentially by the patient.

In some examples, the techniques described with respect to process 26 may be embodied within a computer-readable storage medium, such as a computer-readable storage medium of client computing device 80 and/or computer 70. The computer-readable storage medium storing computer-executable instructions that, when executed, configure a processor to perform the techniques described with respect to process 26.

Following the design of removable dental appliances 52, manufacturing facility 48 fabricates removable dental appliances 52 in accordance with the digital tooth structure data 46 and prescription data 47. Construction of removable dental appliances 52 may include 3D printing, thermoforming, injection molding, lost wax casting, 5-axis milling, laser cutting, hybrid plastic and metal manufacturing techniques, such as snap-fitting and overmolding, as well as other manufacturing techniques.

Figure 14:
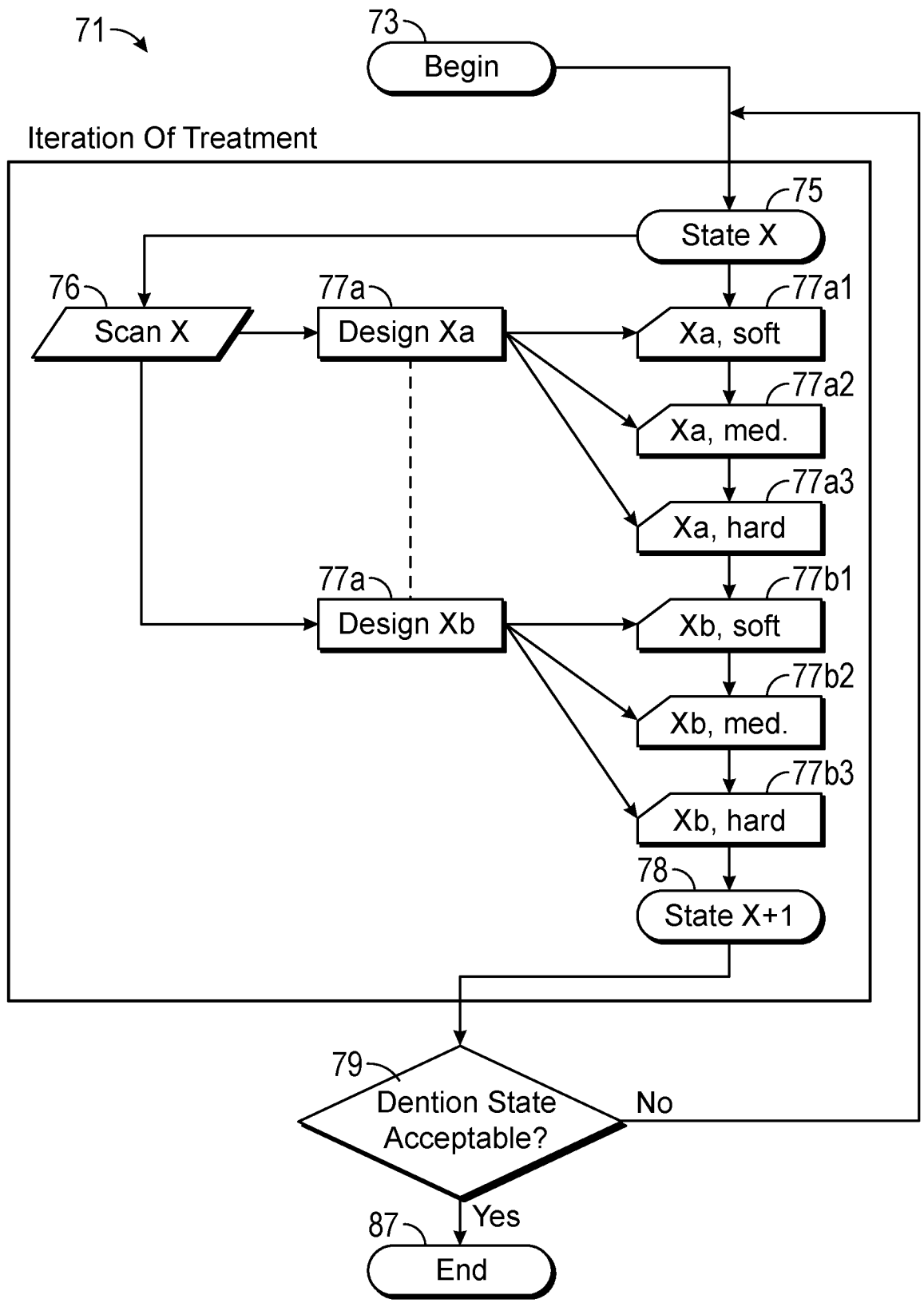
FIG. 14 is a flow diagram illustrating successive iterations of treatment using an ordered set of removable dental appliances.

FIG. 14 is a flow diagram 71 illustrating successive iterations of treatment using an ordered set of removable dental appliances. The ordered set of removable dental appliances is configured to reposition one or more teeth of a patient. In various examples, the ordered set of removable dental appliances may include one or more of removable dental appliances described herein. Accordingly, treatment may feature a plurality of the removable dental appliances described herein and need not be limited to iterations of one particular dental appliance embodiment. In one exemplary implementation, the treatment may initially begin with iterations of one or more removable dental appliance described herein and, once the patient's teeth have moved a certain desired amount, treatment may continue with iterations of removable dental appliance described herein.

In block 73, treatment begins with the first iteration of treatment. At the beginning of the first iteration of treatment, the patient's teeth are at their initial positions as represented by dentition state X in block 75. In block 76, a scan of the patient's teeth are taken to facilitate the design of the ordered set of removable dental appliances. From the scan of patient's teeth, a computer determines two different shapes and dimensions for removable dental appliances in the ordered set: design 77a and design 77b. Example techniques for creating a digital model of a patient's teeth are described in U.S. Pat. No. 8,738,165 to Cinader et al., titled, "METHODS OF PREPARING A VIRTUAL DENTITION MODEL AND FABRICATING A DENTAL RETAINER THEREFROM," and issued on May 27, 2014. The computer may determine two different shape and dimensions for removable dental appliances in the ordered set by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses and other dimensions of spring-like elements of the removable dental appliances in the ordered set to produce the forces required to move the patient's teeth from the initial positions to their desired positions.

The modeled forces applied by removable dental appliances in the ordered set may further be based on the incremental positional movements of the patient's teeth during the treatment. In this manner, the computer may design shape and dimensions for each of the removable dental appliances in the ordered set according to expected forces applied on the teeth for the predicted positions during the treatment when the removable dental appliances in the ordered set is to be worn by the patient.

In some examples, more than one, such as three, different removable dental appliances in the set of removable dental appliances can be manufactured using each of the two different shapes and dimensions to produce six removable dental appliances in the set of removable dental appliances. The first through third dental appliances within the ordered set of dental appliances are of the same shape and dimensions, but comprise materials with different stiffness characteristics. The second and third dental appliances have higher stiffness characteristics than the first dental appliance and the third dental appliance also having higher stiffness characteristics than second dental appliance. Likewise, the fourth through sixth dental appliances within the ordered set of dental appliances are of the same shape and dimensions, but comprise materials with different stiffness characteristics. The fifth and sixth dental appliances having higher stiffness characteristics than fourth dental appliance, and the sixth dental appliance also having higher stiffness characteristics than fifth dental appliance. In some examples, the first dental appliance may have the same stiffness characteristics as the fourth dental appliance.

Likewise, in some examples, the second dental appliance may have the same stiffness characteristics as the fifth dental appliance. Further, in some examples, the third dental appliance may have the same stiffness characteristics as the sixth dental appliance.

In one exemplary treatment methodology, the first removable dental appliance 77a1 in the ordered set of removable dental appliances is made from a relatively soft material, such as a relatively soft polymeric material. The first removable dental appliance in the ordered set of removable dental appliances conforms to design 77a, and is made from a relatively soft material, such as a relatively soft polymeric material. The second removable dental appliance 77a2 in the ordered set of removable dental appliances conforms to design 77a, and is made from a material of medium stiffness, such as a relatively stiffer polymeric material than with the first removable dental appliance in the ordered set of removable dental appliances. The third removable dental appliance 77a3 in the ordered set of removable dental appliances conforms to design 77a, and is made from a material of high stiffness, such as a relatively stiffer polymeric material than with the second removable dental appliance in the ordered set of removable dental appliances. The fourth removable dental appliance 77b1 in the ordered set of removable dental appliances conforms to design 77b, and is made from a relatively soft material. The fifth removable dental appliance 77b2 in the ordered set of removable dental appliances conforms to design 77b, and is made from a material of medium stiffness. The sixth removable dental appliance 77b3 in the ordered set of removable dental appliances conforms to design 77b, and is made from a material of high stiffness.

The first through sixth removable dental appliances in the ordered set of removable dental appliances are worn in sequence over time by the patient. For example, each of the removable dental appliances in the ordered set of removable dental appliances may be worn between about 2 weeks and about 12 weeks, such as between about 3 weeks and about 10 weeks or between about 4 weeks and about 8 weeks. Following the treatment plan using the first through sixth removable dental appliances, the patient's teeth are at their final positions for the first iteration of treatment as represented by block 78, which shows the detention state X+1.

In block 79, the patient may return to the clinician who may evaluate the result of the first iteration of treatment. In the event that the first iteration of treatment has resulted in satisfactory final placement of the patient's teeth, the treatment may be ended in block 87. However, if the first iteration of treatment did not complete the desired movement of the patient's teeth, one or more additional iterations of treatment may be performed and the process can continue to block 73. To begin the next iteration of treatment, the clinician take another scan of the patient's teeth to facilitate the design of the ordered set of removable dental appliances in block 76. In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of flow diagram 71 represent one specific example, and a variety of modifications may be made to the techniques of flow diagram 71 within the spirit of this disclosure. For example, an ordered set of removable dental appliances may include more or less than six removable dental appliances. As another example, each removable dental appliance in the ordered set of removable dental appliances may have unique shapes and dimensions.

List of Illustrative Embodiments

1. An orthodontic bracket comprising:
   a bracket body comprising:
      an outer body;
      an inner body disposed adjacent the outer body; and
   a bracket base disposed adjacent the inner body and configured to couple to the tooth.

1a. The orthodontic bracket of any of the preceding embodiments, wherein the inner body is disposed adjacent to the bracket base.

1b. The orthodontic bracket of any of the preceding embodiments, wherein the inner body is disposed between the outer body and the bracket base.

1c. The orthodontic bracket of any of the preceding embodiments, wherein the inner body is coupled to the outer body.

1d. The orthodontic bracket of any of the preceding embodiments, wherein the inner body is coupled to the bracket base.

1e. The orthodontic bracket of any of the preceding embodiments, wherein the inner body is formed from an elastomeric material.

1f. The orthodontic bracket of any of the preceding embodiments, wherein the outer body is formed from a rigid material.

1g. The orthodontic bracket of any of the preceding embodiments, wherein the modulus of elasticity of the outer body is greater than that of the inner body.

2. The orthodontic bracket of any of the preceding embodiments, wherein the outer body comprises a slot for an arch member.

2a. The orthodontic bracket of any of the preceding embodiments, wherein the outer body comprises a securement means for an arch member.

2b. The orthodontic bracket of any of the preceding embodiments, wherein the outer body comprises a tie wing.

2c. The orthodontic bracket of any of the preceding embodiments, further comprising a slot coupled to the outer body.

3. The orthodontic bracket of any of the preceding embodiments, wherein the bracket base has a first cross-sectional area, the outer body has a second cross-sectional area, and the inner body has a third-cross sectional area.

3a. The orthodontic bracket of any of the preceding embodiments, wherein the first cross-sectional area is defined by a first plane parallel to a second plane defined by a slot, wherein the first plane is planar with the distal most end of the tooth, wherein the first plane and the second plane are perpendicular to a third plane, wherein the third plane is defined by the slot and a midpoint of the bracket.

3b. The orthodontic bracket of any of the preceding embodiments, wherein the second cross-sectional area is defined by a fourth plane parallel to the second plane and the fourth plane is planar with the distal most end of the base.

3c. The orthodontic bracket of any of the preceding embodiments, wherein the third cross-sectional area is defined by a fifth plane parallel to the second plane and the fifth plane is planar with the distal most end of the inner body.

4a. The orthodontic bracket of any of the preceding embodiments, wherein the third cross-sectional area is at least 50% of the first cross-sectional area.

4b. The orthodontic bracket of any of the preceding embodiments, wherein the third cross-sectional area is at least 75% of the first cross-sectional area.

5a. The orthodontic bracket of any of the preceding embodiments, wherein the third cross-sectional area is at least 75% of the second cross-sectional area.

5b. The orthodontic bracket of any of the preceding embodiments, wherein the third cross-sectional area is at least 85% of the second cross-sectional area.

5c. The orthodontic bracket of any of the preceding embodiments, wherein the third cross-sectional area is at least 90% of the second cross-sectional area.

6a. The orthodontic bracket of any of the preceding embodiments, wherein the second cross-sectional area is at least 10% of the first cross-sectional area.

6b. The orthodontic bracket of any of the preceding embodiments, wherein the second cross-sectional area is no greater than 90% of the first cross-sectional area.

6c. The orthodontic bracket of any of the preceding embodiments, wherein the bracket base has a first thickness, and the inner body has a second thickness, wherein the second thickness is at least the first thickness.

6d. The orthodontic bracket of any of the preceding embodiments, wherein the bracket base has a first thickness, and the inner body has a second thickness, wherein the second thickness is at least 120% of the first thickness.

6e. The orthodontic bracket of any of the preceding embodiments, wherein the first thickness is measured from the thinnest section of the bracket base.

7a. The orthodontic bracket of any of the preceding embodiments, wherein the inner body at least partially contacts at least one major surface of the outer body.

7b. The orthodontic bracket of any of the preceding embodiments, wherein the inner body continuously contacts at least one major surface of the outer body.

7c. The orthodontic bracket of any of the preceding embodiments, wherein the inner body is no greater than flush with the outer body.

8a. The orthodontic bracket of any of the preceding embodiments, wherein the inner body at least partially covers at least one major surface of the bracket base.

8b. The orthodontic bracket of any of the preceding embodiments, wherein the inner body envelops at least one major surface of the bracket base.

8c. The orthodontic bracket of any of the preceding embodiments, wherein the inner body has at least one flange.

8d. The orthodontic bracket of any of the preceding embodiments, wherein the flange is no greater than 5% of the first cross-sectional area.

9a. The orthodontic bracket of any of the preceding embodiments, wherein the inner body at least partially interlocks with the outer body.

9b. The orthodontic bracket of any of the preceding embodiments, wherein the inner body at least partially interlocks with the bracket base.

9c. The orthodontic bracket of any of the preceding embodiments, wherein the inner body comprises at least one protrusion.

9d. The orthodontic bracket of any of the preceding embodiments, wherein the inner body comprises a plurality of protrusions.

9e. The orthodontic bracket of any of the preceding embodiments, wherein the body or the base comprises at least one recessed area to interlock with at least one of the protrusions.

10. The orthodontic bracket of any of the preceding embodiments, wherein the inner body has a modulus of elasticity no greater than 175000 megapascals.

11. The orthodontic bracket of any of the preceding embodiments, wherein the inner body has a modulus of elasticity of no greater than 120000 megapascals.

12. The orthodontic bracket of any of the preceding embodiments, wherein the inner body has a modulus of elasticity of no greater than 60000 megapascals.

13. The orthodontic bracket of any of the preceding embodiments, wherein the inner body has a modulus of elasticity of no greater than 10000 megapascals.

14. The orthodontic bracket of any of the preceding embodiments, wherein the inner body has a modulus of elasticity of no greater than 5000 megapascals.

15. The orthodontic bracket of any of the preceding embodiments, wherein the inner body has a modulus of elasticity of no greater than 2500 megapascals.

16. The orthodontic bracket of any of the preceding embodiments, wherein the inner body has a modulus of elasticity of no greater than 1000 megapascals.

17. The orthodontic bracket of any of the preceding embodiments, wherein the inner body has a modulus of elasticity of no greater than 500 megapascals.

18. The orthodontic bracket of any of the preceding embodiments, wherein the inner body has a modulus of elasticity of at least 100 megapascals.

18a. The orthodontic bracket of any of the preceding embodiments, wherein the inner body has thickness of at least 0.1 mm.

18b. The orthodontic bracket of any of the preceding embodiments, wherein the inner body has thickness of at least 0.5 mm.

18c. The orthodontic bracket of any of the preceding embodiments, wherein the inner body has thickness of at least 0.75 mm.

19. The orthodontic bracket of any of the preceding embodiments, wherein the inner body comprises a rubber.

19a. The orthodontic bracket of any of the preceding embodiments, wherein the inner body comprises a silicone rubber.

20. The orthodontic bracket of any of the preceding embodiments, wherein the inner body comprises a polyurethane.

21. The orthodontic bracket of any of the preceding embodiments, wherein the inner body comprises a polymeric material sufficient to allow the outer body to flex at least 20% with respect to the bracket base.

22. The orthodontic bracket of any of the preceding embodiments, wherein the bracket base is substantially planar to a tooth.

23. The orthodontic bracket of any of the preceding embodiments, wherein the outer body secures the arch wire on at least 2 surfaces.

24. The orthodontic bracket of any of the preceding embodiments, wherein the bracket base abuts the tooth.

25. The orthodontic bracket of any of the preceding embodiments, further comprising an adhesive disposed on the bracket base.

26. The orthodontic bracket of any of the preceding embodiments, wherein the adhesive is applied to a surface contacting the tooth.

27. The orthodontic bracket of any of the preceding embodiments, wherein the bracket base contacts the outer body.

28. The orthodontic bracket of any of the preceding embodiments, wherein the tooth is a ceramic.

29. The orthodontic bracket of any of the preceding embodiments, wherein the bracket base is a polymeric substance adjacent to a tooth.

30. The orthodontic bracket of any of the preceding embodiments, wherein at least the outer body, bracket base, and combinations thereof comprise a polymeric substance.

31. A removable dental appliance comprising:
a plurality of polymeric shell portions each having one or more cavities shaped therein to receive one or more teeth and wherein each of the plurality of shell portions is formed to be separate from the other plurality of shell portions;

31a. The removable dental appliance of any of the preceding embodiments, further comprising an inner body; and 31b. The removable dental appliance of any of the preceding embodiments, further comprising an outer body.

31c. The removable dental appliance of any of the preceding embodiments, further comprising the orthodontic bracket of any of the preceding embodiments.

31d. The removable dental appliance of any of the preceding embodiments, wherein the bracket base of the orthodontic bracket forms at least part of a polymeric shell portion.

32. The removable dental appliance of any of the preceding embodiments, further comprising:
an arch member coupled to the outer body, wherein the arch member provides one or more forces to reposition one or more teeth from a first orientation to a successive orientation.

32a. The removable dental appliance of any of the preceding embodiments, wherein the polymeric shell portion, and the inner body are a single piece.

33. The removable dental appliance of any of the preceding embodiments, wherein the arch member, polymeric shell portion, and the orthodontic bracket are a single piece.

34. The removable dental appliance of any of the preceding embodiments, wherein the orthodontic bracket is attached to the lingual side of the of the polymeric shell portion.

35. The removable dental appliance of any of the preceding embodiments, wherein the orthodontic bracket is attached to the labial side of the polymeric shell portion.

36. The removable dental appliance of any of the preceding embodiments, wherein a first orthodontic bracket is attached to the labial side and a second orthodontic bracket is attached to the lingual side of the polymeric shell portion.

37. The removable dental appliance of any of the preceding embodiments, wherein the robustness of the arch member is related to a resiliency of the inner body.

38. The removable dental appliance of any of the preceding embodiments, wherein the inner body has a modulus of elasticity no greater than a modulus of elasticity of the arch member.

39. The removable dental appliance of any of the preceding embodiments, wherein the arch member is formed from a polymer.

40. The removable dental appliance of any of the preceding embodiments, wherein the arch member has a lower fracture point than yield point.

41. The removable dental appliance of any of the preceding embodiments, wherein the polymeric arch member comprises polyurethane resin.

42. The removable dental appliance of any of the preceding embodiments, wherein the polymeric arch member comprises methacrylate resin.

43. The removable dental appliance of any of the preceding embodiments, wherein a first shell portion and a second shell portion of the at least one shell portions are designed to provide one or more forces to reposition one or more teeth received within one or more cavities formed in the first or second shell portions from a first orientation to a successive orientation and wherein the arch member transfers force between the first shell portion and the second shell portion to reposition the one or more teeth.

44. The removable dental appliance of any of the preceding embodiments, wherein the first shell portion and the second shell portion are coupled to each other.

45. The removable dental appliance of any of the preceding embodiments, wherein the first shell portion and the second shell portion are coupled to each other through the arch member.

46. The removable dental appliance of any of the preceding embodiments, wherein the arch member has one or more bends in the relaxed state.

47. The removable dental appliance of any of the preceding embodiments, wherein the arch member comprises a ribbon.

48. The removable dental appliance of any of the preceding embodiments, wherein the shell portion has a lingual side having a first height and a labial side having a second height, the ribbon has a third height.

49. The removable dental appliance of any of the preceding embodiments, wherein the third height is at least 50% of the first height.

50. The removable dental appliance of any of the preceding embodiments, wherein the third height is at least 75% of the first height.

51. The removable dental appliance of any of the preceding embodiments, wherein the third height is at least 85% of the first height.

52. The removable dental appliance of any of the preceding embodiments, wherein the third height is at least 95% of the first height.

53. The removable dental appliance of any of the preceding embodiments, wherein the third height is at least 50% of the second height.

54. The removable dental appliance of any of the preceding embodiments, wherein the third height is at least 75% of the second height.

55. The removable dental appliance of any of the preceding embodiments, wherein the third height is at least 85% of the second height.

56. The removable dental appliance of any of the preceding embodiments, wherein the third height is at least 95% of the second height.

57. The removable dental appliance of any of the preceding embodiments, wherein the arch member comprises a wire.

58. The removable dental appliance of any of the preceding embodiments, wherein the wire is polymeric.

59. The removable dental appliance of any of the preceding embodiments, wherein the shell portion comprises a first polymer and the orthodontic bracket comprises a second polymer.

60. The removable dental appliance of any of the preceding embodiments, wherein the shell portion comprises a first polymer and the arch member comprises a second polymer.

61. The removable dental appliance of any of the preceding embodiments, wherein the first shell portion has a cut-out that fits a tooth.

62. The removable dental appliance of any of the preceding embodiments, wherein the cut-out exposes at least 50% of the surface area of the tooth.

63. A method of making the removable dental appliance of any of the preceding embodiments comprising:
receiving a digital representation of a dental structure of a patient;
determining dimensions and shapes of a removable dental appliance based forces required to modify the dental structure from an initial position to an adjusted position when the removable dental appliance is worn by the patient; and
forming the removable dental appliance.

64. The method of any of the preceding embodiments, further comprising forming the orthodontic bracket of any of the preceding embodiments with the removable dental appliance in a location sufficient to modify the dental structure.

65. The method of any of the preceding embodiments, further comprising attaching the orthodontic bracket to a shell portion of the removable dental appliance in a location sufficient to modify the dental structure.

66. The method of any of the preceding embodiments, further comprising forming the arch member of any of the preceding embodiments.

67. The method of any of the preceding embodiments, further comprising:
coupling the arch member to the orthodontic bracket.

68. The method of any of the preceding embodiments, wherein forming the removable dental appliance comprises:
forming, from a first polymeric material, a plurality of shell portions each having at least one cavity shaped to receive one or more teeth of a user;
forming, from a second polymeric material, the orthodontic bracket of any of the preceding embodiments; and
forming, from a third polymeric material, an arch member,
wherein the removable dental appliance is formed as a single piece.

69. The method of any of the preceding embodiments, wherein forming the removable dental appliance comprises printing the removable dental appliance of any of the preceding embodiments at substantially the same time.

70. The method of any of the preceding embodiments, wherein the third polymeric material is the same as the first polymeric material.

71. The method of any of the preceding embodiments, wherein the first polymeric material comprises a poly(meth)acrylate.

72. The method of any of the preceding embodiments, wherein the second polymeric material comprises one or more multi-functional urethane (meth)acrylates.

73. The method of any of the preceding embodiments, wherein the fracture point of the polyurethane is no greater than the yield point.

74. The method of any of the preceding embodiments, wherein the tolerance of a shell portion is no greater than 0.25 mm with respect to a major surface of a tooth.

75. The method of any of the preceding embodiments, wherein the forming the plurality of shell portions is performed by:
a) providing a printable composition comprising a high viscosity polymerizable component, a temporary solvent, and an initiator;

b) selectively curing the printable composition to form an article representing the shape of the three-dimensional object;
c) removing a substantial amount of the temporary solvent from the article; and optionally curing unpolymerized polymerizable component remaining before or after step c.

76. A kit, comprising:
the inner body of any of the preceding embodiments; and
the outer body of any of the preceding embodiments.

77. The kit, further comprising:
the bracket base of any of the preceding embodiments.

78. A method of making an orthodontic bracket comprising:
receiving one or more dimensions of an outer body and a bracket base;
determining one or more dimensions of an inner body based on the one or more dimensions of the outer body and the bracket base;
forming the inner body based on the one or more dimensions of the inner body.

79. The method of any of the preceding embodiments, further comprising:
coupling the inner body to the outer body.

80. The method of any of the preceding embodiments, further comprising:
coupling the inner body to the bracket base.

81. The method of any of the preceding embodiments, wherein the forming the inner body further comprises:
forming a mold based on the one or more dimensions of the inner body;
adding a material into the mold;
curing the material to form the inner body; and
removing the inner body.

82. The method of any of the preceding embodiments, wherein the one or more dimensions of the inner body comprise at least one of: in-out, angulation, inclination, torque, tip, and combinations thereof.

The invention claimed is:

1. An orthodontic appliance comprising:
a plurality of polymeric shell portions each having one or more cavities shaped therein to receive one or more teeth and formed separately from one another, wherein each polymeric shell portion has a base and includes an inner body and an outer body, wherein each outer body is connected to an arch member,
the arch member providing one or more forces to reposition one or more teeth from a first orientation to a successive orientation;
each inner body coupled to each outer body, wherein each inner body is elastomeric; and
wherein each inner body is disposed between each outer body and each polymeric shell base, wherein the outer bodies, inner bodies, arch member, and plurality of polymeric shells and bases are formed as a single, integral appliance.

2. The orthodontic appliance of claim 1, wherein each inner body has thickness of at least 0.1 mm.

3. The orthodontic appliance of claim 1, wherein each inner body at least partially contacts at least one major surface of each outer body.

4. The orthodontic appliance of claim 1, wherein each inner body has a modulus of elasticity no greater than a modulus of elasticity of the arch member.

5. The orthodontic appliance of claim 1, wherein each inner body comprises a first polymeric material and the arch member comprises a second polymeric material, and wherein the first and second polymeric materials are different.

6. The orthodontic appliance of claim 1, wherein each inner body has a modulus of elasticity of no greater than 2500 megapascals.

7. The orthodontic appliance of claim 1, wherein each base has a first thickness, and each inner body has a second thickness, wherein the second thickness is at least the first thickness.

8. The orthodontic appliance of claim 1, wherein each base has a first cross-sectional area, each outer body has a second cross-sectional area, and each inner body has a third-cross sectional area, wherein the third cross-sectional area is at least 50% of the first cross-sectional area.

9. The orthodontic appliance of claim 8, wherein the third cross-sectional area is at least 75% of the second cross-sectional area.

10. The orthodontic appliance of claim 1, wherein each base has a first thickness, each inner body has a second thickness, wherein the second thickness is at least 120% of the first thickness.

11. The removable dental appliance of claim 9, wherein each inner body has a modulus of elasticity no greater than a modulus of elasticity of the arch member.

12. A method of making the orthodontic appliance of claim 1 comprising:
receiving one or more dimensions of the plurality of polymeric shells, the outer bodies, the bases, and an arch member of the appliance of claim 1;
determining one or more dimensions of the inner bodies based on the one or more dimensions of the of the outer bodies and the bases;
forming the inner bodies based on the one or more determined dimensions of the inner bodies; and
forming the outer bodies, inner bodies, arch member, the plurality of polymeric shells and bases as a single, integral appliance.

* * * * *